(12) United States Patent
Matsuno et al.

(10) Patent No.: US 7,093,435 B2
(45) Date of Patent: Aug. 22, 2006

(54) HYDRAULIC CONTROLLER

(75) Inventors: Isao Matsuno, Ueda (JP); Kazuhiro Tagata, Ueda (JP)

(73) Assignee: Nissin Kogyo Co., Ltd., Nagano (JP)

( * ) Notice: Subject to any disclaimer, the term of this patent is extended or adjusted under 35 U.S.C. 154(b) by 13 days.

(21) Appl. No.: 11/002,937

(22) Filed: Dec. 3, 2004

(65) Prior Publication Data

US 2005/0126167 A1    Jun. 16, 2005

(30) Foreign Application Priority Data

Dec. 5, 2003  (JP)  ............................. 2003-406887
Dec. 5, 2003  (JP)  ............................. 2003-406892

(51) Int. Cl.
*F16F 5/00* (2006.01)

(52) U.S. Cl. ....................... 60/552; 92/181 P
(58) Field of Classification Search ................ 60/552; 91/422, 423; 92/181 R, 181 P
See application file for complete search history.

(56) References Cited

U.S. PATENT DOCUMENTS 4,721,345 A * 1/1988 Nishimura et al. ...... 303/113.1
6,170,383 B1 * 1/2001 Mauritz ....................... 91/399
6,189,745 B1 * 2/2001 Frank .......................... 222/509
6,352,316 B1 * 3/2002 Oka et al. ................. 303/114.3
6,546,950 B1 * 4/2003 Juan ............................ 137/270

FOREIGN PATENT DOCUMENTS

| DE | 3627902 A1 | 2/1988 |
|---|---|---|
| DE | 3736059 A1 | 5/1989 |
| DE | 3817178 A1 | 11/1989 |
| DE | 3906411 A1 | 9/1990 |
| JP | 2002-308085 | 10/2002 |

* cited by examiner

*Primary Examiner*—Thomas E. Lazo
(74) *Attorney, Agent, or Firm*—Arent Fox PLLC

(57) ABSTRACT

A hydraulic controller includes: a pair of liquid chambers; and an on-off valve capable of opening and closing a flow channel on the side of the liquid chamber with a higher hydraulic pressure out of the pair of liquid chambers. The flow channel can provide communication between the pair of liquid chambers. A baffling device is provided in the liquid chamber with a lower hydraulic pressure, to baffle hydraulic fluid flowing from the liquid chamber with the higher hydraulic pressure. Thus, it is possible to reduce operating noise resulting from operation of the on-off valves.

9 Claims, 13 Drawing Sheets

HYDRAULIC CONTROLLER

RELATED APPLICATION DATA

The Japanese priority application Nos. 2003-406887 and 2003-406892 upon which the present application is based are hereby incorporated in their entirety herein by reference.

BACKGROUND OF THE INVENTION

1. Field of the Invention

The present invention relates to a hydraulic controller comprising: a pair of liquid chambers; and an on-off valve capable of opening and closing a flow channel on the side of the liquid chamber with a higher hydraulic pressure out of the pair of liquid chambers, the flow channel being capable of providing communication between the pair of liquid chambers.

2. Description of the Related Art

Such a hydraulic controller is used, for example, to control brake hydraulic pressure in a vehicle braking system, and is disclosed, for example, in Japanese Patent Application Laid-Open No. 2002-308085.

The conventional hydraulic controller uses an on-off valve for a hydraulic booster in order to operate wheel brakes with boosted pressure. When an on-off valve is opened, brake fluid in the liquid chamber with a higher pressure flows into the liquid chamber with a lower pressure via a small-diametered flow channel. Since the lower-pressure liquid chamber is wider than the small-diametered flow channel, the brake fluid flowing from the flow channel into the lower-pressure liquid chamber causes an abrupt pressure change, thereby producing operating noise.

SUMMARY OF THE INVENTION

In view of the above circumstances, the present invention has an object to provide a hydraulic controller which can reduce operating noise resulting from operation of an on-off valve.

To achieve the above object, according to a first feature of the present invention, there is provided a hydraulic controller comprising: a pair of liquid chambers; and an on-off valve capable of opening and closing a flow channel on the side of the liquid chamber with a higher hydraulic pressure out of the pair of liquid chambers, the flow channel being capable of providing communication between the pair of liquid chambers, wherein baffling means is provided in the liquid chamber with a lower hydraulic pressure out of the pair of liquid chambers, to baffle hydraulic fluid flowing from the higher-pressure liquid chamber into the lower-pressure liquid chamber.

With the configuration of the first aspect, when the high-pressure hydraulic fluid flows from the higher-pressure liquid chamber into the lower-pressure liquid chamber upon opening of the on-off valve, the high-pressure hydraulic fluid is baffled by the baffling means, to prevent an abrupt pressure change in the hydraulic fluid flowing from the higher-pressure liquid chamber via the respective flow channel into the lower-pressure liquid chamber, thereby reducing operating noise and pulsating noise resulting from operation of the on-off valve.

According to a second feature of the present invention, in addition to the arrangement of the first feature, the baffling means is a flow rate control valve which varies aperture area of the flow channel opening to the lower-pressure liquid chamber according to pressure difference between the lower-pressure liquid chamber and the flow channel. With this configuration, when the high-pressure hydraulic fluid flows from the higher-pressure liquid chamber into the lower-pressure liquid chamber upon opening of the on-off valve, the flow rate control valve not only baffles the hydraulic fluid, but also controls its flow rate. This prevents an abrupt pressure change in the hydraulic fluid flowing from the higher-pressure liquid chamber via the flow channel into the lower-pressure liquid chamber, to thereby reduce operating noise and pulsating noise resulting from operation of the on-off valves.

According to a third feature of the present invention, in addition to the arrangement of the second feature, a valve disc of the flow rate control valve is slidably supported by a support shaft extending linearly and coaxial with the flow channel, and is spring-urged in a direction to close the end of the flow channel which is open to the lower-pressure liquid chamber. This configuration, in which the valve disc of the flow rate control valve is supported in contact with the support shaft, can prevent self-excited vibration of the valve disc, thereby preventing noise caused by the self-excited vibration.

According to a fourth feature of the present invention, in addition to the arrangement of the third feature, a first on-off valve is interposed between an input-side liquid chamber and a control-side liquid chamber, and comprises a valve seat whose middle part faces the end of the flow channel which is open to the input-side liquid chamber, and a first valve disc which is spring-urged in a direction to be seated on the valve seat and is housed in the input-side liquid chamber, a second on-off valve is interposed between a release-side liquid chamber and the control-side liquid chamber to be opened upon opening of the first on-off valve, and comprises a second valve disc which is housed in the control-side liquid chamber so as to be able to reciprocate coaxially with the flow channel of the first on-off valve, and the second valve disc integrally comprises the support shaft which can be inserted into the flow channel to abut against and push the first valve disc in a valve opening direction. With this configuration, when controlling the hydraulic pressure of the control-side liquid chamber by opening and closing the first and second on-off valves, the valve disc of the flow rate control valve is supported by the support shaft which is integral with the second valve disc and used to operate the first on-off valve, thereby reducing the number of parts to reduce the size of the entire hydraulic controller.

According to a fifth feature of the present invention, in addition to the arrangement of the fourth feature, the hydraulic controller further comprises a hydraulic booster composed of: a control piston on which brake operating input from a brake operating member acts in a forward direction; a reaction means connected coaxially with the control piston so as to apply a reaction force caused by hydraulic pressure of a boosted hydraulic pressure chamber to the control piston in a backward direction, the boosted hydraulic pressure chamber generating boosted hydraulic pressure used to operate wheel brakes; the first on-off valve which opens during advance of the control piston and closes during retraction of the control piston, being interposed between the input-side liquid chamber communicated with a hydraulic power source and the control-side liquid chamber connected to the boosted hydraulic pressure chamber; and the second on-off valve which closes during advance of the control piston and opens during retraction of the control piston, being interposed between the release-side liquid chamber communicated with a reservoir and the control-side liquid chamber, wherein the hydraulic booster regulates hydraulic pressure of the hydraulic power source so as to balance the brake operating input with the reaction force caused by hydraulic pressure of the boosted hydraulic pressure chamber through back and forth movements of the control piston, and applies the hydraulic pressure of the hydraulic power source to the boosted hydraulic pressure chamber, and wherein the baffling means is provided in the control-side liquid chamber.

With the configuration according to the fifth aspect, the baffling means baffles the high-pressure brake fluid flowing from the input-side liquid chamber into the control-side liquid chamber upon opening of the first on-off valve installed in the hydraulic booster. Thus, it is possible to reduce the operating noise and pulsating noise resulting from operation of the on-off valve.

The above and other objects, features, and advantages of the present invention will become readily apparent from the following detailed description of the preferred embodiments thereof taken in conjunction with the accompanying drawings.

DESCRIPTION OF THE PREFERRED EMBODIMENT

Figure 1:
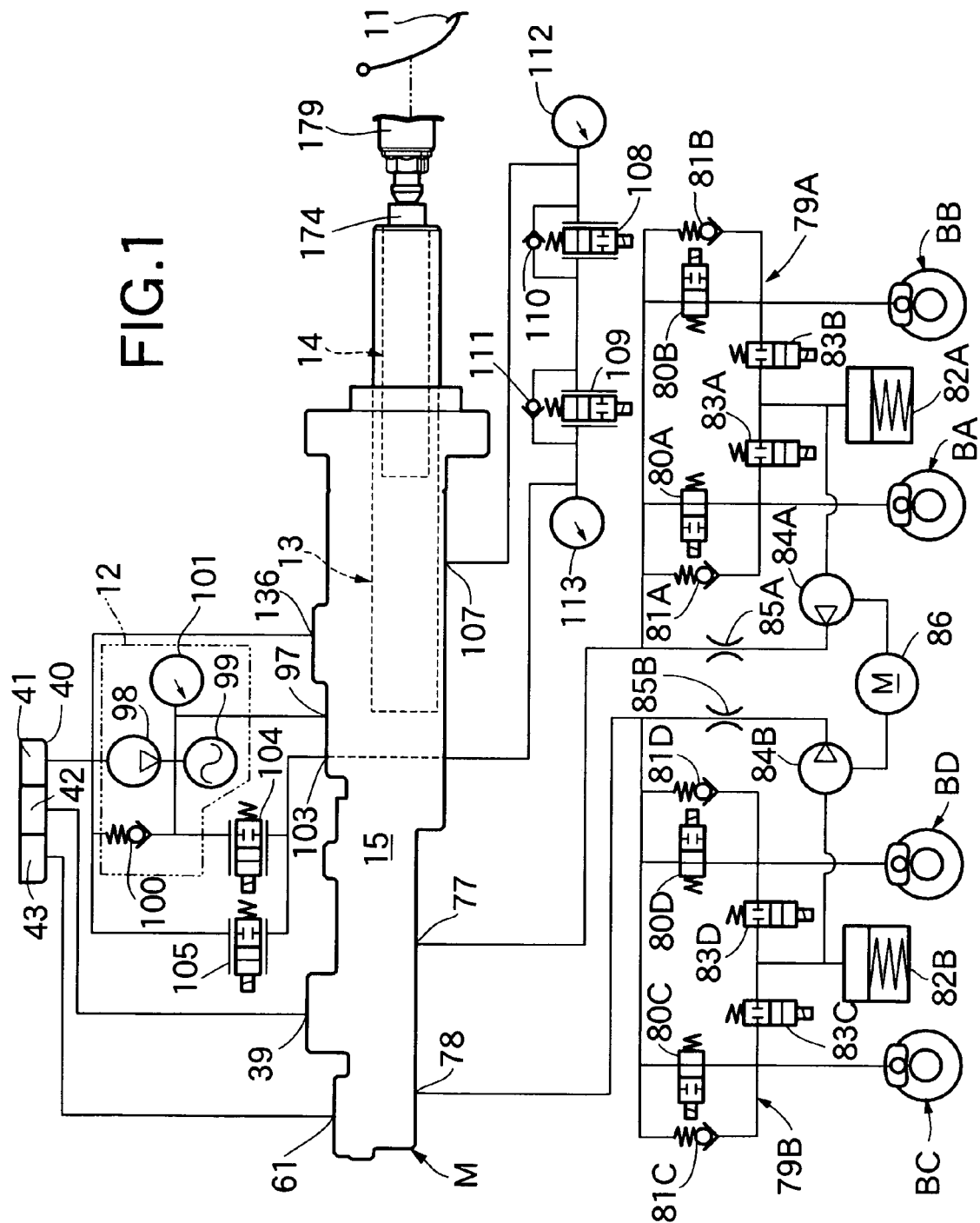
FIG. 1 is a brake hydraulic system diagram showing an overall configuration of a vehicle braking system.

An embodiment of the present invention will be described below with reference to FIGS. 1 to 7. Referring first to FIG. 1, a braking system for a four-wheeled vehicle comprises: a tandem master cylinder M; a hydraulic booster 13 which regulates hydraulic pressure of a hydraulic power source 12 according to a brake operating force inputted from a brake pedal 11 serving as a brake operating member, and which applies the hydraulic pressure to the master cylinder M; and a brake stroke simulator 14 interposed between the brake pedal 11 and hydraulic booster 13.

Figure 2:
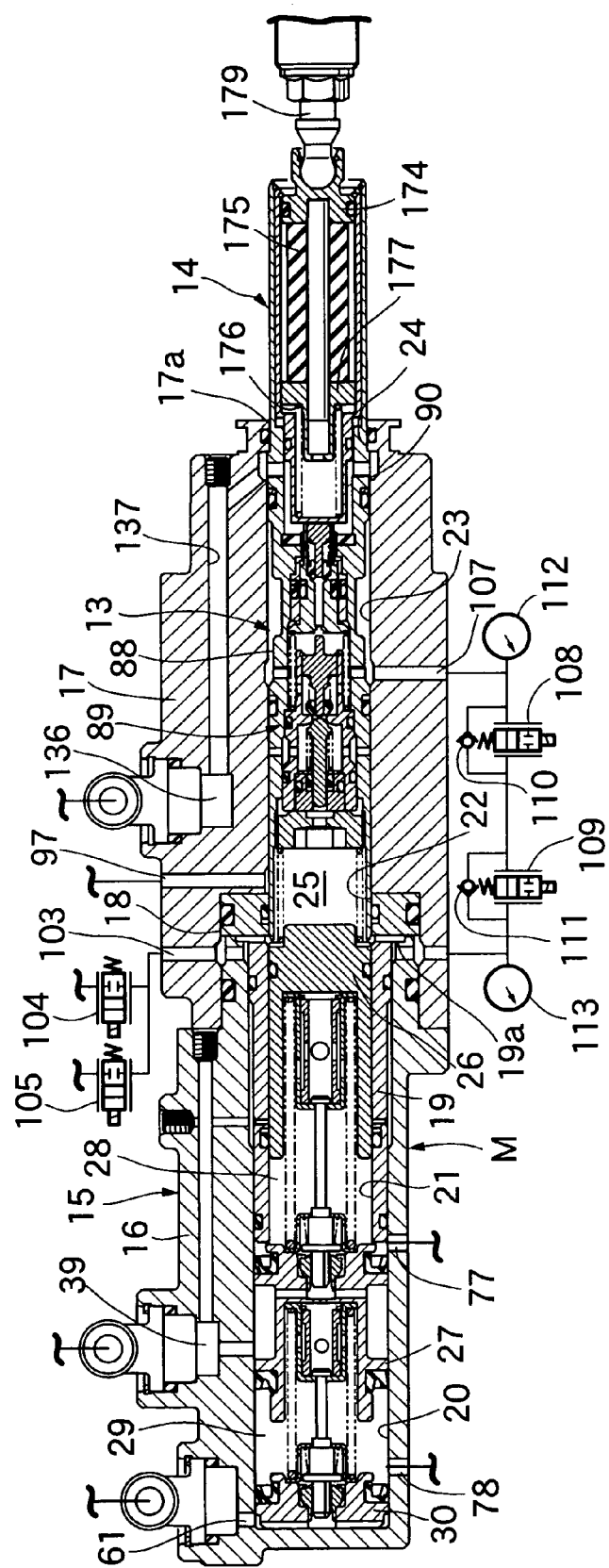
FIG. 2 is a longitudinal sectional view of a master cylinder, hydraulic booster, and brake stroke simulator, according to a first embodiment of the present invention.

Referring also to FIG. 2, a casing 15 common to the master cylinder M and hydraulic booster 13 houses a first cylinder body 16 of a bottomed cylindrical shape with its front end closed; a second cylinder body 17 which is cylindrical in shape, has an inward flange 17a on its rear end, and is coupled coaxially with the rear part of the first cylinder body 16; a ring-shaped separator 18 sandwiched between the first and second cylinder bodies 16 and 17; and a cylindrical sleeve 19 which is equipped with an outward flange 19a sandwiched between the separator 18 and the rear end of first cylinder body 16 on its rear end, and is inserted and fastened in the rear part of the first cylinder body 16.

The casing 15 is provided with a series of cylinder holes ranging concentrically in order from its front end: a first cylinder hole 20 formed by the front inner circumference of the first cylinder body 16, a second cylinder hole 21 formed by the inner circumference of the sleeve 19 and smaller in diameter than the first cylinder hole 20, a third cylinder hole 22 formed by the inner circumference of the separator 18 and slightly smaller in diameter than the second cylinder hole 21, a fourth cylinder hole 23 formed by the inner circumference of the second cylinder body 17 excluding the inward flange 17a and substantially equal in diameter to the second cylinder hole 21, and a fifth cylinder hole 24 formed by the inner circumference of the inward flange 17a of the second cylinder body 17 and smaller in diameter than the fourth cylinder hole 23.

Figure 3:
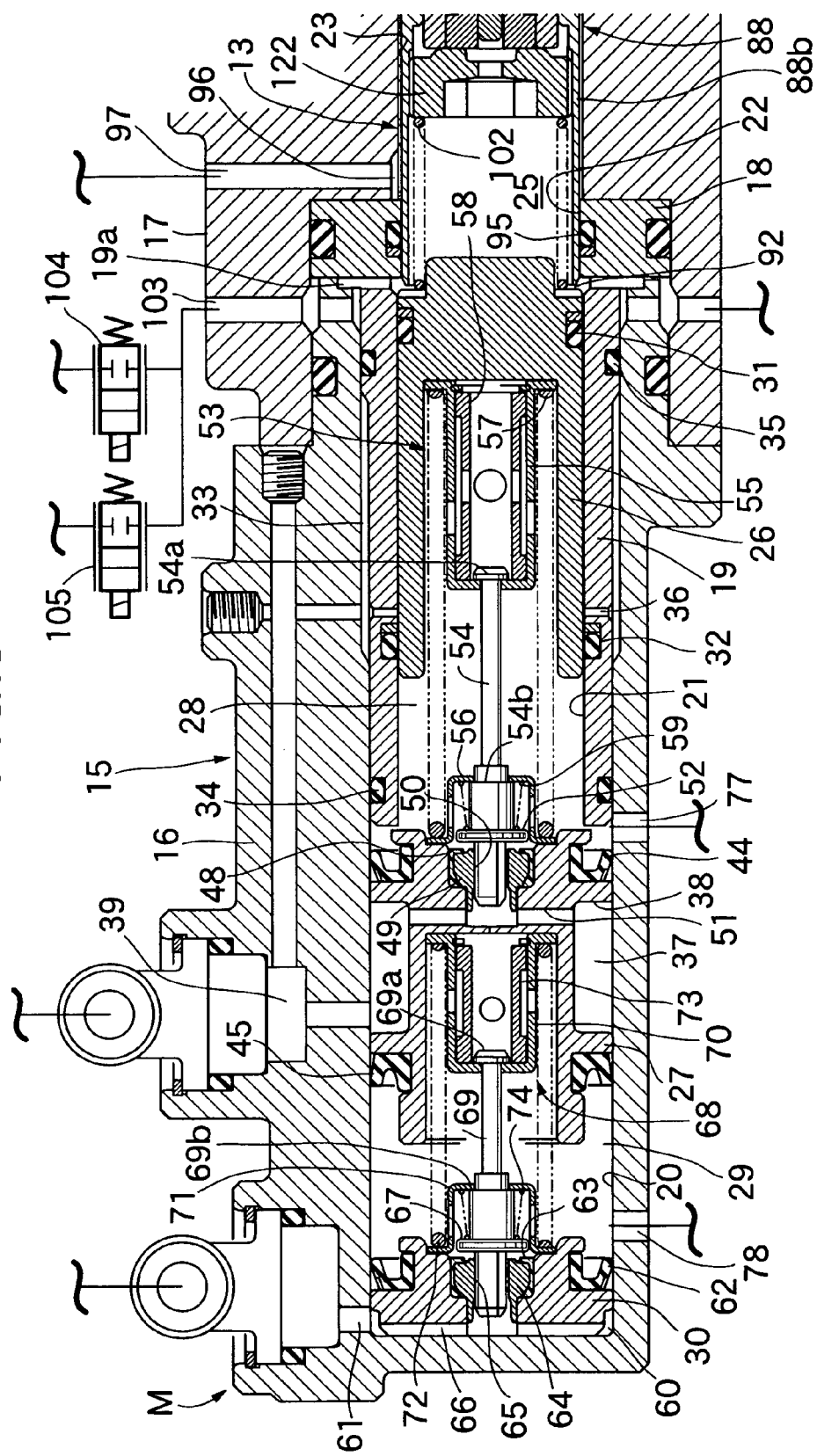
FIG. 3 is an enlarged longitudinal sectional view of the master cylinder.

Referring also to FIG. 3, in the master cylinder M, a rear master piston 26 spring-urged backward is slidably inserted into the second cylinder hole 21 in the casing 15 with its back turned to a boosted hydraulic pressure chamber 25, a front master piston 27 spring-urged backward and placed ahead of the rear master piston 26 is slidably inserted into the first cylinder hole 20 in the casing 15, a rear output hydraulic chamber 28 is formed between the rear master piston 26 and front master piston 27, and a front output hydraulic chamber 29 is formed between a disc-shaped seat supporting member 30 fitted liquid-tight in the front end of the casing 15—i.e., the front end of the first cylinder body 16—and the front master piston 27.

An annular piston-side sealing member 31 and sleeve-side sealing member 32, spaced axially, are interposed between the rear master piston 26 and the sleeve 19, where the rear master piston 26 has a bottomed cylindrical shape with its front end opened. The piston-side sealing member 31 is mounted on the rear outer circumference of the rear master piston 26, in sliding contact with the inner circumference of the second cylinder hole 21. The sleeve-side sealing member 32 is mounted on the inner circumference of the sleeve 19, in contact with the front outer circumference of the rear master piston 26 when the rear master piston 26 is at its fully retracted position.

An annular release chamber 33 is formed between the outer circumference of the sleeve 19 and first cylinder body 16. The opposite ends of the annular release chamber 33 in the axial direction are sealed with an annular sealing member 34 and annular sealing member 35, where the annular sealing member 34 is mounted on the front outer circumference of the sleeve 19 and placed resiliently in contact with the inner circumference of the first cylinder body 16 while the annular sealing member 35 is mounted on the rear outer circumference of the sleeve 19 and placed resiliently in contact with the inner circumference of the first cylinder body 16. Besides, the sleeve 19 has a plurality of communicating holes 36 provided between the sealing members 31 and 32 which in turn are interposed between the sleeve 19 and rear master piston 26. The communicating holes 36 are provided in such a manner that the part between the axially opposite ends sealed with the sealing members 31 and 32 out of the part between the inner circumference of the sleeve 19 and outer circumference of the rear master piston 26 is communicated with the annular release chamber 33.

An annular recess 38 which forms a rear annular chamber 37 in conjunction with the inner circumference of the first cylinder body 16 is provided on the outer circumference of the front master piston 27. A rear release port 39 communicated with the rear annular chamber 37 and the annular release chamber 33 is provided on the first cylinder body 16. The rear release port 39 is communicated with the second oil sump 42 among of the first, second, and third oil sumps 41, 42, and 43 formed independently of one another in a reservoir 40 as shown in FIG. 1.

On the outer circumference of the front master piston 27, a rear lip seal 44 is interposed between the rear output hydraulic chamber 28 and rear annular chamber 37 to allow brake fluid to flow from the rear annular chamber 37 to the rear output hydraulic chamber 28 so that the rear output hydraulic chamber 28 can be replenished with brake fluid while a front lip seal 45 is interposed between the front output hydraulic chamber 29 and rear annular chamber 37. Consequently, the second cylinder hole 21 formed by the inner circumference of the sleeve 19 is smaller in diameter than the first cylinder hole 20, and thus a seal diameter of the rear master piston 26 formed by the piston-side sealing member 31 and the sleeve-side sealing member 32 is smaller than a seal diameter of the front master piston 27 formed by the lip seals 44 and 45.

A valve hole forming member 49 is press-fitted in the center of the rear end of the front master piston 27, an annular seat member 48 made of rubber is baked onto the outer circumference of the valve hole forming member 49, and a plurality of communicating channels 51 are provided behind the front master piston 27 to communicate a valve hole 50 provided in the center of the valve hole forming member 49 with the rear annular chamber 37.

A disc-shaped valve disc 52 which can close the valve hole 50 when seated on the seat member 48 is installed near, and integrally with, the front end of a rod 54 which forms part of maximum distance limiting means 53 installed between the rear and front master pistons 26 and 27 to limit the maximum distance between the rear and front master pistons 26 and 27. The front end of the rod 54 is inserted into the valve hole 50 so as to allow passage of the brake fluid through the valve hole 50 when the valve disc 52 is lifted from the seat member 48.

The maximum distance limiting means 53 comprises a rear retainer 55 which is formed into a bottomed cylindrical shape with its front end closed and is abutted by the rear master piston 26, a front retainer 56 which is formed into a bottomed cylindrical shape with its rear end closed and is abutted by the rear end of the front master piston 27, a rear return spring 57 which is mounted under compression between the rear and front retainers 55 and 56 and urges the rear master piston 26 backward, and the rod 54 which movably penetrates the closed front end of the rear retainer 55 and closed rear end of the front retainer 56.

The rod 54 is equipped with an engagement flange 54a on its rear end and with an engagement shoulder 54b behind the valve disc 52, where the engagement flange 54a can be engaged with the closed front end of the rear retainer 55 from behind, and the engagement shoulder 54b can be engaged with the closed rear end of the front retainer 56 from ahead. A guide tube 58 is fitted and fastened in the rear retainer 55 to guide axial movement of the engagement flange 54a.

With the rear retainer 55 substantially fastened to the rear master piston 26 by spring force of the rear return spring 57, with the front retainer 56 substantially fastened to the front master piston 27 by spring force of the rear return spring 57, and with the rear master piston 26 located at its fully retracted position as shown in FIG. 3, the maximum distance limiting means 53 limits the maximum distance between the rear and front master pistons 26 and 27, as the engagement flange 54a is engaged with the closed front end of the rear retainer 55 from behind, and the engagement shoulder 54b is engaged with the closed rear end of the front retainer 56 from ahead. At this time, the valve disc 52 is lifted from the seat member 48 to open the valve hole 50.

Moreover, a valve spring 59 smaller in spring load than the rear return spring 57 is mounted under compression between the front retainer 56 and valve disc 52, and as the rear master piston 26 moves forward from its fully retracted position, the valve disc 52 is seated on the seat member 48 by spring force of the valve spring 59 to close the valve hole 50.

A front annular chamber 60 is formed between an inner surface of the front end of the first cylinder hole 20 and the seat supporting member 30, and a front release port 61 communicated with the front annular chamber 60 is provided on the front of the first cylinder body 16. The front release port 61 is communicated with the third oil sump 43 formed in the reservoir 40 as shown in FIG. 1. Moreover, a lip seal 62 is mounted on the outer circumference of the seat supporting member 30 and placed resiliently in contact with the inner circumference of the first cylinder body 16 to allow the brake fluid to flow from the front annular chamber 60 to the front output hydraulic chamber 29.

A valve hole forming member 64 is press-fitted in the center of the seat supporting member 30, an annular seat member 63 made of rubber is baked onto the outer circumference of the valve hole forming member 64, and a plurality of communicating grooves 66 are provided in front of the seat supporting member 30 to communicate a valve hole 65 provided in the center of the valve hole forming member 64 with the front annular chamber 60.

A disc-shaped valve disc 67 which can close the valve hole 65 when seated on the seat member 63 is provided near the front end of a rod 69 which forms part of maximum distance limiting means 68 installed between the seat supporting member 30 and front master piston 27, to limit the maximum distance between the seat supporting member 30 and front master piston 27. The front end of the rod 69 is inserted into the valve hole 65 so as to allow passage of the brake fluid through the valve hole 65 when the valve disc 67 is lifted from the seat member 63.

The maximum distance limiting means 68 comprises a rear retainer 70 which is formed into a bottomed cylindrical shape with its front end closed and is abutted by the front master piston 27, a front retainer 71 which is formed into a bottomed cylindrical shape with its rear end closed and is abutted by the rear end of the seat supporting member 30, a front return spring 72 which is mounted under compression between the rear and front retainers 70 and 71 and urges the front master piston 27 backward, and the rod 69 which movably penetrates the closed front end of the rear retainer 70 and closed rear end of the front retainer 71.

The rod 69 is equipped with an engagement flange 69a on its rear end and with an engagement shoulder 69b behind the valve disc 67, where the engagement flange 69a can be engaged with the closed front end of the rear retainer 70 from behind, and the engagement shoulder 69b can be engaged with the closed rear end of the front retainer 71 from ahead. A guide tube 73 is fitted and fastened in the rear retainer 70 to guide axial movement of the engagement flange 69a.

With the rear retainer 70 substantially fastened to the front master piston 27 by spring force of the front return spring 72, with the front retainer 71 substantially fastened to the seat supporting member 30 by spring force of the front return spring 72, and with the front master piston 27 located at its fully retracted position as shown in FIG. 3, the maximum distance limiting means 68 limits the maximum distance between the seat supporting member 30 and front master piston 27, as the engagement flange 69a is engaged with the closed front end of the rear retainer 70 from behind, and the engagement shoulder 69b is engaged with the closed rear end of the front retainer 71 from ahead. At this time, the valve disc 67 is lifted from the seat member 63 to open the valve hole 65.

Moreover, a valve spring 74 smaller in spring load than the front return spring 72 is mounted under compression between the front retainer 71 and valve disc 67, and as the front master piston 27 moves forward from its fully retracted position, the valve disc 67 is seated on the seat member 63 by spring force of the valve spring 74 to close the valve hole 65.

The first cylinder body 16 is equipped with a rear output port 77 which outputs hydraulic pressure of the rear output hydraulic chamber 28 whose pressure is increased along with forward movement of the rear master piston 26, and with a front output port 78 which outputs hydraulic pressure of the front output hydraulic chamber 29 whose pressure is increased along with forward movement of the front master piston 27. Moreover, as shown in FIG. 1, the rear output port 77 is connected to right front BA and left rear wheel brakes BA and BB via a first pressure regulating means 79A, while the front output port 78 is connected to left front and right rear wheel brakes BC and BD via a second pressure regulating means 79B.

The first pressure regulating means 79A comprises a normally open solenoid valve 80A installed between the rear output port 77 and right front wheel brake BA, a normally open solenoid valve 80B installed between the rear output port 77 and left rear wheel brake BB, one-way valves 81A and 81B which allow passage of the brake fluid to the rear output port 77 and are connected in parallel with the normally open solenoid valves 80A and 80B, respectively, a normally closed solenoid valve 83A installed between the right front wheel brake BA and a first reservoir 82A, a normally closed solenoid valve 83B installed between the left rear wheel brake BB and first reservoir 82A, a first return pump 84A which returns the brake fluid pumped from the first reservoir 82A to the rear output port 77, and an orifice 85A provided between the first return pump 84A and rear output port 77.

The second pressure regulating means 79B comprises a normally open solenoid valve 80C installed between the front output port 78 and left front wheel brake BC, a normally open solenoid valve 80D installed between the front output port 78 and right rear wheel brake BD, one-way valves 81C and 81D which allow passage of the brake fluid to the front output port 78 and are connected in parallel with the normally open solenoid valves 80C and 80D, respectively, a normally closed solenoid valve 83C installed between the left front wheel brake BC and a second reservoir 82B, a normally closed solenoid valve 83D installed between the right rear wheel brake BD and second reservoir 82B, a second return pump 84B which returns the brake fluid pumped from the second reservoir 82B to the front output port 78, and an orifice 85B provided between the second return pump 84B and front output port 78.

The first and second return pumps 84A and 84B are connected commonly to a single electric motor 86, by which they are driven commonly.

The first and second pressure regulating means 79A and 79B can freely control the brake fluid outputted from the rear and front output ports 77 and 78. Through hydraulic control, the first and second pressure regulating means 79A and 79B can also perform antilock brake control during a braking operation, traction control in a non-braking situation, etc.

Figure 4:
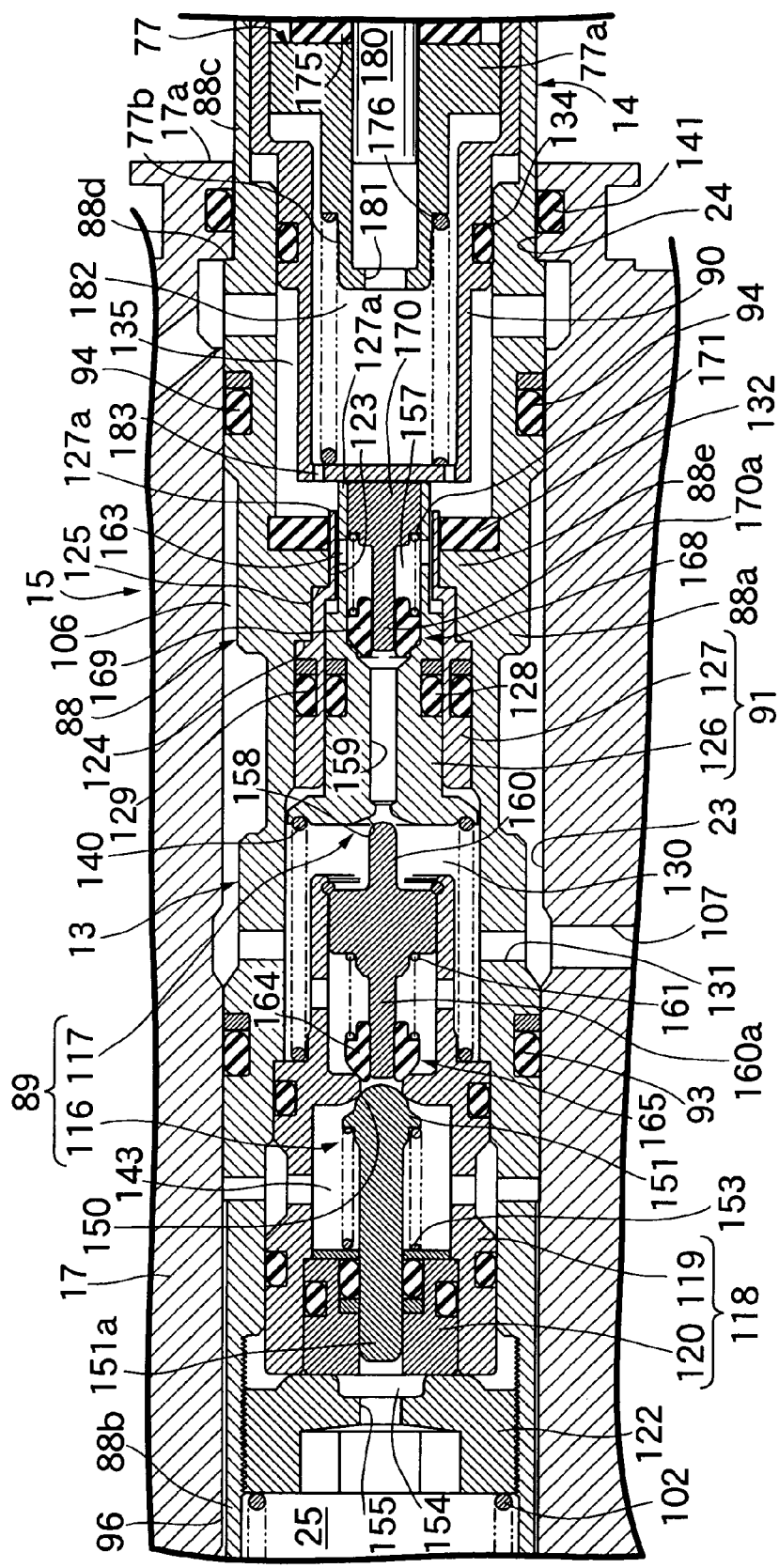
FIG. 4 is an enlarged longitudinal sectional view of the hydraulic booster.

Referring to FIG. 4, the hydraulic booster 13 comprises a backup piston 88 which has a stepped cylindrical shape and is slidably housed in the casing 15 with its face turned to the boosted hydraulic pressure chamber 25, a control valve means 89 contained in the backup piston 88, a control piston 90 which makes the control valve means 89 regulate pressure so as to achieve a balance between the reaction force generated by the hydraulic pressure of the boosted hydraulic pressure chamber 25 and the brake operating force inputted from the brake pedal 11 via the brake stroke simulator 14, and a reaction means 91 placed between the control valve means 89 and control piston 90.

The backup piston 88 integrally comprises a piston body 88a which slidably fits in the fourth cylinder hole 23, a cylindrical pusher 88b which is coaxially and integrally linked to the front end of the piston body 88a by slidably penetrating the third cylinder hole 22, and a cylindrical extension tube 88c which is coaxially and integrally linked to the rear end of the piston body 88a and extends beyond the casing 15 by slidably penetrating the fifth cylinder hole 24, where the pusher 88b can push the rear master piston 26 forwardly by directly abutting against the rear end of the rear master piston 26.

On the outer circumference of the backup piston 88, a limiting shoulder 88d is formed near the rear end between the piston body 88a and extension tube 88c. The limiting shoulder 88d defines the fully retracted position of the backup piston 88 within the casing 15 as it abuts the inward flange 17a at the rear end of the second cylinder body 17 in the casing 15 from ahead.

Annular sealing members 93 and 94, spaced axially, are mounted on the outer circumference of the piston body 88a of the backup piston 88, and placed resiliently in sliding contact with the inner circumference of the fourth cylinder hole 23. An annular sealing member 95 is mounted on the inner circumference of the separator 18, and placed resiliently in sliding contact with the outer circumference of the pusher 88b of the backup piston 88. Thus, the third cylinder hole 22 is slightly smaller in diameter than the second and fourth cylinder holes 21 and 23 which are substantially equal in diameter, and the pusher 88b, which has a seal diameter smaller than seal diameters of the rear master piston 26 and piston body 88a, fits slidably in the third cylinder hole 22 of the casing 15.

An annular input chamber 96 is formed between the second cylinder body 17 and backup piston 88 in the casing 15, and the axially opposite ends of the input chamber 96 is sealed by the annular sealing member 93, which is nearer to the front out of the two annular sealing members 93 and 94 mounted on the outer circumference of the piston body 88a, and by the annular sealing member 95 mounted on the inner circumference of the separator 18. The input chamber 96 is communicated with an input port 97 provided in the second cylinder body 17.

When the pusher 88b of the backup piston 88 pushes the rear master piston 26 of the master cylinder M forwardly, the boosted hydraulic pressure chamber 25 increases in volume and the input chamber 96 decreases in volume, where the volume increase of the boosted hydraulic pressure chamber 25 is substantially equal to the volume decrease of the input chamber 96.

The input port 97 is communicated with a hydraulic power source 12 as shown in FIG. 1. The hydraulic power source 12 comprises a hydraulic pump 98 which pumps the brake fluid from the first oil sump 41 of the reservoir 40, an accumulator 99 connected to a discharge port of the hydraulic pump 98, a relief valve 100 installed between the discharge port of the hydraulic pump 98 and first oil sump 41, and a hydraulic pressure sensor 101 which detects the hydraulic pressure of the accumulator 99 to control operation of the hydraulic pump 98. High-pressure brake fluid normally maintained at a constant pressure is supplied from the hydraulic power source 12 to the input port 97, and thus to the input chamber 96.

A spring 102 housed in the boosted hydraulic pressure chamber 25 is mounted under compression between the backup piston 88 and rear master piston 26 whose fully retracted positions in the casing 15 are fixed. The spring force of the spring 102 urges the backup piston 88 and rear master piston 26 in such a direction as to separate them from each other.

Thus, in a non-braking state, the maximum distance limiting means 53 and 68 keep the distance between the closed front end of the casing 15 and rear master piston 26 within a predetermined maximum distance. In this state, a clearance 92 is formed between the rear master piston 26 and front end of the backup piston 88 at its fully retracted position so as to make the rear master piston 26 approach the backup piston 88 from ahead and oppose it. Thus, the spring 102 is smaller in spring load than the rear return spring 57 and front return spring 72. The spring 102 maintains the clearance 92 between the rear master piston 26 and backup piston 88 in a non-braking state.

As the output hydraulic pressure of the hydraulic power source 12 acts on the input chamber 96, hydraulic pressure acts in the retracting direction on the backup piston 88, while the spring force of the spring 102 also acts in the retracting direction on the backup piston 88. Preferably, the combined force of the hydraulic pressure in the retracting direction and the spring force of the spring 102 in the retracting direction is 300 to 1000 N.

In the casing 15, the second cylinder body 17, first cylinder body 16, and sleeve 19 are equipped with a boosted hydraulic pressure input port 103 which is communicated with the boosted hydraulic pressure chamber 25. As shown in FIG. 1, the boosted hydraulic pressure input port 103 is connected to the hydraulic power source 12 via a normally closed linear solenoid valve 104 for automatic brake pressurization, and to the first oil sump 41 of the reservoir 40 via a normally closed pressure-reducing linear solenoid valve 105 for regeneration and coordination. That is, the normally closed linear solenoid valve 104 for automatic brake pressurization is interposed between the boosted hydraulic pressure chamber 25 and hydraulic power source 12, while the normally closed pressure-reducing linear solenoid valve 105 for regeneration and coordination is interposed between the boosted hydraulic pressure chamber 25 and reservoir 40.

An annular output chamber 106 is formed between the piston body 88a of the backup piston 88 and second cylinder body 17 in the casing 15 in such a manner that its axially opposite ends are sealed by the pair of annular sealing members 93 and 94 mounted on the outer circumference of the piston body 88a. Also, a boosted hydraulic pressure output port 107 communicated with the output chamber 106 is provided in the second cylinder body 17.

The boosted hydraulic pressure output port 107 is connected to the boosted hydraulic pressure input port 103, via a normally open linear solenoid valve 108 for automatic brake depressurization and a normally open pressurizing linear solenoid valve 109 for regeneration and coordination which are connected in series. A first one-way valve 110 is connected in parallel to the normally open linear solenoid valve 108 for automatic brake depressurization, to allow the brake fluid to flow from the servo-hydraulic output port 107 to the boosted hydraulic pressure input port 103. Also, a second one-way valve 111 is connected in parallel to the pressurizing linear solenoid valve 109 for regeneration and coordination, to allow the brake fluid to flow from the boosted hydraulic pressure input port 103 to the boosted hydraulic pressure output port 107.

That is, the linear solenoid valve 108 for automatic brake depressurization connected in parallel to the first one-way valve 110 as well as the pressurizing linear solenoid valve 109 for regeneration and coordination connected in parallel to the second one-way valve 111 are interposed between the output chamber 106 and boosted hydraulic pressure chamber 25.

Moreover, a hydraulic pressure sensor 112 for detecting the amount of brake operation is connected between the boosted hydraulic pressure output port 107 and the linear solenoid valve 108 for automatic brake depressurization, while a hydraulic pressure sensor 113 for automatic brake feedback control is connected between the pressurizing linear solenoid valve 109 for regeneration and coordination and the boosted hydraulic pressure input port 103.

Figure 5:
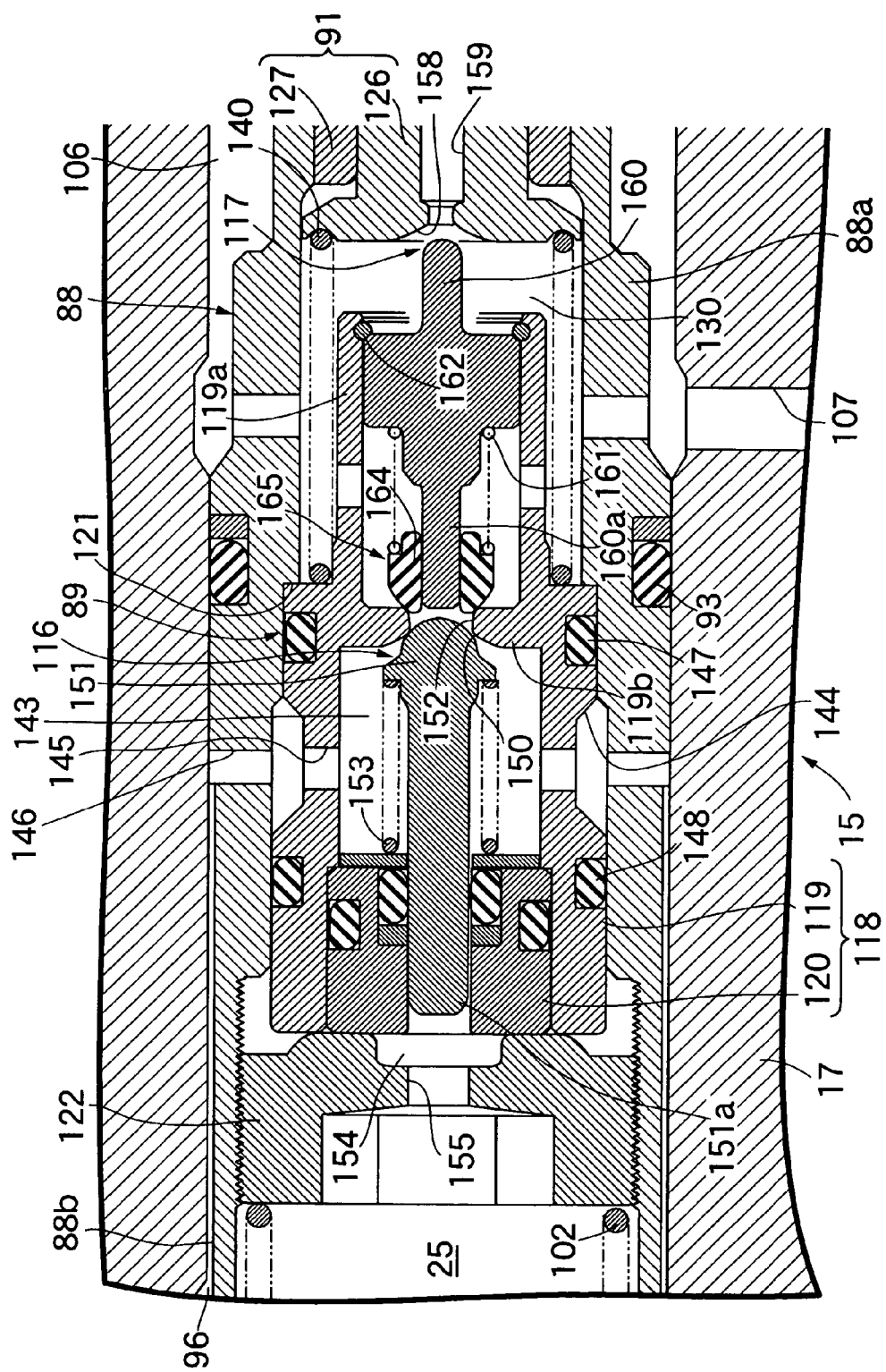
FIG. 5 is an enlarged view of a main part of FIG. 4.

Referring also to FIG. 5, the pressure regulating means 89 consists of a booster valve 116 and pressure-reducing valve 117. The pressure regulating means 89 is contained in the piston body 88a of the backup piston 88, and can provide communication between the input chamber 96 and the output chamber 106, and between the first oil sump 41 of the reservoir 40 and the output chamber 106, when the output hydraulic pressure of the hydraulic power source 12 decreases.

A valve housing 118 consisting of a housing body 119 with a stepped cylindrical shape and an end wall member 120 fitted and fastened liquid-tight in the front end of the housing body 119, is coaxially fitted and fastened in the piston body 88a of the backup piston 88. An annular shoulder 121 which faces the master cylinder M is provided in an inner surface of the piston body 88a. The valve housing 118 is fitted in the piston body 88a from ahead until it abuts the shoulder 121. A disc-shaped presser member 122 which sandwiches the valve housing 118 between itself and the shoulder 121 is screwed into the piston body 88a of the backup piston 88. The spring 102 housed in the boosted hydraulic pressure chamber 25 is mounted under compression between the rear master piston 26 of the master cylinder M and the presser member 122.

On the piston body 88a of the backup piston 88 behind the valve housing 118, an inward flange 88e sticks out radially from the piston body 88a, an insertion hole 123 concentric with the fourth cylinder hole 23 is formed in the inner circumference of the inward flange 88e, and a seat member 132 made of an elastic annular plate abuts against the inward flange 88e from ahead. Between the inward flange 88e and valve housing 118, a pair of limiting shoulders 124 and 125, spaced axially, are installed on an inner surface of the piston body 88a.

Reaction means 91 consists of a first reaction piston 126 and a second reaction piston 127 which has a stepped cylindrical shape and slidably fits around the first reaction piston 126. The second reaction piston 127 is slidably fitted in the piston body 88a with its backward limit fixed by at least one of the limiting shoulders 124 and 125. An annular sealing member 128 is mounted on the outer circumference of the first reaction piston 126, being placed in sliding contact with the inner circumference of the second reaction piston 127, while an annular sealing member 129 is mounted on the outer circumference of the second reaction piston 127, being placed in sliding contact with the inner circumference of the piston body 88a.

A control-side liquid chamber 130 is formed in the piston body 88a of the backup piston 88 behind the valve housing 118, facing the front ends of the first and second reaction pistons 126 and 127. The control-side liquid chamber 130 is communicated with the output chamber 106 via a plurality of communicating holes 131 provided in the piston body 88a. Thus, the output chamber 106 is connected to the boosted hydraulic pressure chamber 25 via a normally open linear solenoid valve 108 for automatic brake depressurization and a normally open pressurizing linear solenoid valve 109 for regeneration and coordination. Consequently, during normal braking operation, the control-side liquid chamber 130 is equal in hydraulic pressure to the boosted hydraulic pressure chamber 25, causing the hydraulic pressure of the boosted hydraulic pressure chamber 25 to act on the front ends of the first and second reaction pistons 126 and 127.

Figure 6:
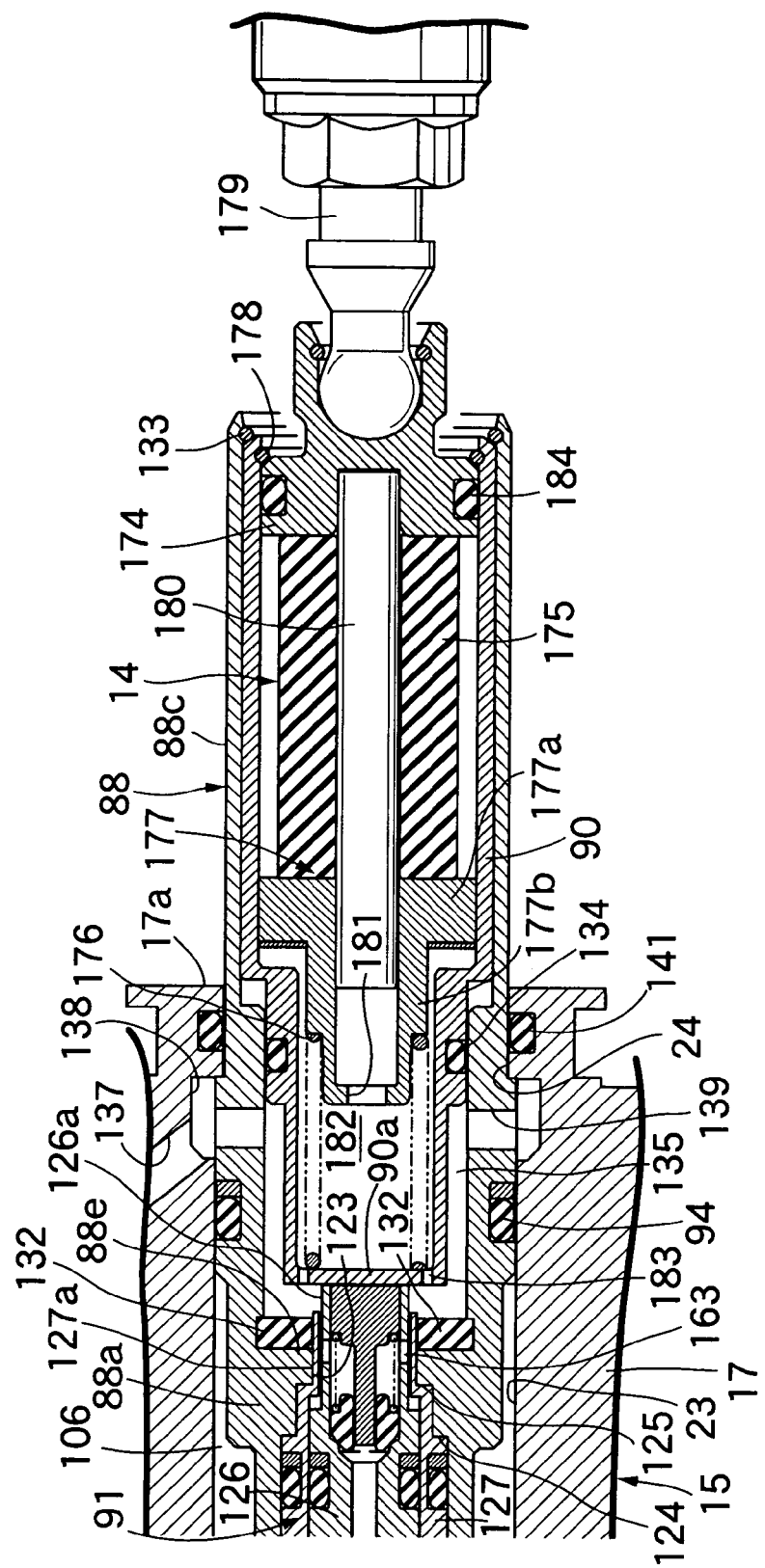
FIG. 6 is an enlarged longitudinal sectional view of the brake stroke simulator.

Referring also to FIG. 6, the control piston 90 is formed as a stepped closed-end tube with its front end closed and with an end wall 90a at an front end, and is relatively slidably fitted in the rear parts of the extension tube 88c and piston body 88a of the backup piston 88. A snap ring 133 is fitted in the rear end of the extension tube 88c of the backup piston 88 to abut against the rear end of the control piston 90, thereby preventing the control piston 90 from coming off from the backup piston 88.

The first reaction piston 126 has an extension tube 126a which is coaxial and integral therewith and which extends backward through the insertion hole 123. The rear end of the extension tube 126a constantly abuts against an end wall 90a on the front end of the control piston 90. The control-side liquid chamber 130 houses a spring 140 which is mounted under compression between the valve housing 118 and front end of the first reaction piston 126 to urge the rear end of the first reaction piston 126, i.e., the rear end of the extension tube 126a to come into contact with the end wall 90a of the control piston 90. The spring 140 has a very weak spring force.

The second reaction piston 127 has an extension tube 127a which is coaxial and integral therewith to surround the extension tube 126a of the first reaction piston 126. The extension tube 127a is inserted into the insertion hole 123. In a state in which the second reaction piston 127 is located at its fully retracted position in abutment with at least one of the limiting shoulders 124 and 125, the rear end of the extension tube 127a of the second reaction piston 127 is placed behind the seat member 132 abutted by the inward flange 88e of the backup piston 88, but ahead of the rear end of the extension tube 126a of the first reaction piston 126.

When the control piston 90 advances toward the backup piston 88, the first reaction piston 126 moves forward along with the control piston 90, and when the control piston 90 advances through a predetermined travel distance or more, the front end of the end wall 90a of the control piston 90 abuts against the rear end of the second reaction piston 127.

An annular sealing member 134 which comes into resilient contact with the rear inner circumference of the piston body 88a of the backup piston 88 is mounted on the front outer circumference of the control piston 90. In the rear part of the piston body 88a, a release chamber 135 which is sealed from outside by the sealing member 134 is formed to face the front end of the control piston 90. On the other hand, in the second cylinder body 17 in the casing 15, there are provided a release port 136 communicated with the first oil sump 41 of the reservoir 40 and a release channel 137 communicated with the release port 136, as well as an annular recess 138 which opens to an inner surface of the fourth cylinder hole 23 so as to be communicated with the release channel 137. Moreover, the backup piston 88 is equipped with a plurality of communicating holes 139 to ordinarily keep the release chamber 135 communicated with the annular recess 138. The annular recess 138 is sealed both from ahead and behind by the annular sealing member 94 mounted on the outer circumference of the backup piston 88 and an annular sealing member 141 mounted on an inner surface of the fifth cylinder hole 24 ahead of the annular recess 138 and placed in sliding contact with the outer circumference of the extension tube 88c of the backup piston 88. Consequently, the release chamber 135 is ordinarily kept communicated with the first oil sump 41 of the reservoir 40.

The housing body 119 of the valve housing 118 integrally comprises a cylindrical guide tube 119a extending backward into the control-side liquid chamber 130, and an inward flange 119b sticking out radially inward from the front end of the guide tube 119a. In the valve housing 118, an input-side liquid chamber 143 is formed between the inward flange 119b and the end wall member 120. An annular recess 144 is provided in the outer circumference of the housing body 119 of the valve housing 118, and a plurality of communicating holes 145 are provided in the housing body 119, to communicate the input-side liquid chamber 143 with the annular recess 144. Also, a plurality of communicating channels 146 which extend in the radial direction of the second cylinder body 17 are provided in the piston body 88a of the backup piston 88, to communicate the inner end with the annular recess 144 and communicate the outer end with the input chamber 96, so that the input-side liquid chamber 143 is communicated with the hydraulic power source 12. Moreover, a pair of annular sealing members 147 and 148 which sandwich the annular recess 144 are mounted on the outer circumference of the housing body 119 of the valve housing 118, and placed resiliently in contact with the inner circumference of the piston body 88a.

The booster valve 116 comprises a booster valve seat 150 formed by the inner periphery of the inward flange 119b of the valve housing 118 and facing the input-side liquid chamber 143, and a poppet-type booster valve disc 151 which is housed in the input-side liquid chamber 143 and can be seated on the booster valve seat 150. An inner surface of the inward flange 119b of the housing body 119 forms a booster channel 152 which can communicate control-side liquid chamber 130 with the input side liquid chamber 143. The front end of the booster channel 152 opens to the center of the booster valve seat 150. The booster valve disc 151 is urged backward by a booster valve spring 153 mounted under compression between the booster valve disc 151 and valve housing 118, i.e., the booster valve disc 151 is urged in a direction to be seated on the booster valve seat 150.

The booster valve disc 151 integrally comprises a rod portion 151a which liquid-tightly and axially movably penetrates the middle part of the end wall member 120 of the valve housing 118. The front end of the rod portion 151a faces a hydraulic chamber 154 formed between the end wall member 120 and the presser member 122. The presser member 122 is equipped with a communicating hole 155 which communicates the hydraulic chamber 154 with the boosted hydraulic pressure chamber 25, causing the hydraulic pressure of the boosted hydraulic pressure chamber 25 to act rearward on the front end of the booster valve disc 151. The pressure receiving area on the front end of the booster valve disc 151 subjected to the hydraulic pressure of the boosted hydraulic pressure chamber 25 is set substantially equal to the sealing area obtained when the booster valve disc 151 is seated on the booster valve seat 150. That is, the diameter of the rod portion 151a is set substantially equal to the diameter of that part of the booster valve seat 150 on which the booster valve disc 151 is seated.

A release-side liquid chamber 157 whose rear end is closed by the front end of the control piston 90, is formed in the extension tube 126a of the first reaction piston 126. A pressure-reducing valve seat 158 facing the control-side liquid chamber 130 and the pressure-reducing flow channel 159 with its front end open to the center of the pressure-reducing valve seat 158 and with its rear end open to the release-side liquid chamber 157, are coaxially mounted in the first reaction piston 126, where the front end of the pressure-reducing flow channel 159 can be communicated with the control-side liquid chamber 130.

The pressure-reducing valve 117 is composed of the pressure-reducing valve seat 158 and a poppet-type pressure-reducing valve disc 160 which is housed in the control-side liquid chamber 130 ahead of the reaction piston 126 to allow its rear end to be seated on the valve seat 158, and is spring-urged backward with its backward limit fixed. The pressure-reducing valve disc 160 can reciprocate coaxially with the booster channel 152, and is urged by a pressure-reducing spring 161 in a direction to be seated on the pressure-reducing valve seat 158.

The pressure-reducing valve disc 160 housed in the control-side liquid chamber 130 is held axially slidably by the guide tube 119a. A snap ring 162 is mounted on the rear end of the guide tube 119a to set the backward limit of the pressure-reducing valve disc 160 by abutting the pressure-reducing valve disc 160 from behind.

A rod portion 160a is mounted coaxially and integrally on the pressure-reducing valve disc 160, extending forward to be inserted into the booster channel 152. The tip of the rod portion 160a abuts against the booster valve disc 151 of the booster valve 116, to push the booster valve disc 151 in a lifting direction from the booster valve seat 150, i.e., in a valve-opening direction against the spring force of the booster valve spring 153.

A release hole 163 communicated with the release-side liquid chamber 157 is provided in the extension tube 126a of the first reaction piston 126 so as to open to an outer surface of the extension tube 126a. The release-side liquid chamber 157 is communicated with the release chamber 135 through the release hole 163 and a clearance between the extension tubes 126a and 127a of the first and second reaction pistons 126 and 127.

When the booster valve 116 is open, the brake fluid in the input-side liquid chamber 143 communicated with the hydraulic power source 12 flows into the control-side liquid chamber 130 through the booster channel 152. The inflow of the brake fluid is controlled by a flow control valve 165 which varies the orifice area of the booster channel 152 opening to the control-side liquid chamber 130 according to the difference in the hydraulic pressure between the booster channel 152 and control-side liquid chamber 130.

The flow control valve 165 has a valve disc 164 which is housed in the guide tube 119a so as to close the booster channel 152 by seating on the inner periphery of the inward flange 119b of the valve housing 118 from the side of the control-side liquid chamber 130. The pressure-reducing spring 161 is mounted under compression between the valve disc 164 and pressure-reducing valve disc 160, to urge the valve disc 164 to be seated on the inner periphery of the inward flange 119b, and the pressure-reducing valve disc 160 to be seated on the pressure-reducing valve seat 158. The valve disc 164 is slidably supported by the rod portion 160a mounted coaxially with the booster channel 152 and integrally with the pressure-reducing valve disc 160.

When the pressure-reducing valve 117 is open, the brake fluid in the control-side liquid chamber 130 flows out to the release-side liquid chamber 157 through the pressure-reducing flow channel 159. The outflow of the brake fluid is controlled by a flow control valve 168 which varies the orifice area of the pressure-reducing flow channel 159 opening to the release-side liquid chamber 157 according to the difference in the hydraulic pressure between the pressure-reducing flow channel 159 and release-side liquid chamber 157.

The flow control valve 168 has a valve disc 169 which is housed in the extension tube 126a of the first reaction piston 126, so as to be seated on the rear part of the first reaction piston 126 to close the pressure-reducing flow channel 159 at a part which faces the release-side liquid chamber 157. The extension tube 126a houses a support member 170 which abuts against the front end of the control piston 90. A valve spring 171 is mounted under compression between the valve disc 169 and the support member 170 to urge the valve disc 169 in a direction to be seated on the rear part of the first reaction piston 126. Moreover, the valve disc 169 is supported by the support shaft 170a mounted coaxially to the pressure-reducing flow channel 159 and integrally with the support member 170.

In the hydraulic booster 13, as brake operating input from the brake pedal 11 is entered the control piston 90 via the brake stroke simulator 14, pressing force of the control piston 90 acts forward on the reaction means 91. Consequently, when the control piston 90 advances less than a predetermined travel distance toward the backup piston 88, the first reaction piston 126 abuts against the control piston 90. As the first reaction piston 126 advances, the pressure-reducing valve disc 160 is seated on the pressure-reducing valve seat 158. As a result, the pressure-reducing valve 117 closes, to block the control-side liquid chamber 130 from the reservoir 40. Then, when the control piston 90, first reaction piston 126, and pressure-reducing valve disc 160 advance further, the booster valve disc 151 is pushed by the rod portion 160a of the pressure-reducing valve disc 160 and lifted from the booster valve seat 150, thereby opening the booster valve 116 to cause the output hydraulic pressure of the hydraulic power source 12 to act on the control-side liquid chamber 130. When the pressure-reducing valve 117 remains closed, the hydraulic pressures of the control-side liquid chamber 130 and the boosted hydraulic pressure chamber 25 are acting on the front part of the first reaction piston 126, the first reaction piston 126 and the control piston 90 retract to achieve a balance between the brake operating input from the brake pedal 11 and hydraulic force produced by the hydraulic pressure of the servo-hydraulic control chamber 130. Consequently, the pressure-reducing valve 117 opens and the booster valve 116 closes. As the booster valve 116 and the pressure-reducing valve 117 repeat opening and closing, the output hydraulic pressure of the hydraulic power source 12 is regulated to servo-hydraulic pressure corresponding to the brake operating input from the brake pedal 11, and is applied to the servo-hydraulic control chamber 130, and thus to the boosted hydraulic pressure chamber 25. When the control piston 90 advances toward the backup piston 88 through a predetermined travel distance or more, the control piston 90 is abutted not only by the first reaction piston 126, but also by the second reaction piston 127. Consequently, the hydraulic pressure of the control-side liquid chamber 130 which pushes the second reaction piston 127 backward adds to the reaction force acting on the control piston 90.

The brake stroke simulator 14 comprises: an input piston 174 which is an input member housed axially slidably in the control piston 90; an elastic body 175 and a coil spring 176 serving as elastic members interposed in series between the input piston 174 and the control piston 90; and a simulator piston 177 linked to the input piston 174 and slidably fitted in the control piston 90. The brake stroke simulator 14 is contained in the control piston 90, and altogether contained in the backup piston 88.

The input piston 174 is slidably housed in the rear part of the control piston 90 with its backward limit fixed by the snap ring 178 mounted on the rear end of the control piston 90. The front end of an input rod 179 linked to the brake pedal 11 is swingably connected with the input piston 174. Thus, a brake operating force corresponding to the operation of the brake pedal 11 is inputted to the input piston 174 via the input rod 179, and the input piston 174 moves forward according to the brake operating force. Besides, a sealing member 184 placed in sliding contact with the inner circumference of the control piston 90 is fitted over the outer circumference of the input piston 174.

The elastic body 175 is made of elastic material such as rubber and has a cylindrical shape. The elastic body 175 and the metallic coil spring 176 smaller in spring load than the elastic body 175 are interposed in series between the input piston 174 and control piston 90 via a simulator piston 177 which comprises a disc 177*a* slidably fitted in the control piston 90 and a bottomed cylindrical portion 177*b* extending into the coil spring 176 and integrally joined with the disc 177*a*.

The rear part of a guide shaft 180 is coaxially press-fitted and fastened in the center of the input piston 174. The front part of the guide shaft 180 axially movably penetrates the center of the disc 177*a* of the simulator piston 177, and slidably fitted in the bottomed cylindrical portion 177*b* of the simulator piston 177.

The elastic body 175 is interposed between the disc 177*a* of the simulator piston 177 and input piston 174, being restricted from bending inward by being fitted with the guide shaft 180. The elastic body 175 can come into resilient contact with the inner circumference of the control piston 90 by expanding its diameter under an axial compressive force produced by forward movement of the input piston 174.

The coil spring 176 is installed between the disc 177*a* of the simulator piston 177 and the closed front end of the control piston 90. When the input piston 174 is at the backward limit, the coil spring 176 is slightly compressed compared to its natural state in which no external load is applied to it. That is, the elastic body 175 is preloaded with the coil spring 176.

A hole 181 is provided in the closed front end of the bottomed cylindrical portion 177*b* of the simulator piston 177, to prevent the pressure inside the bottomed cylindrical portion 177*b* from increasing or decreasing along with forward and backward movements of the guide shaft 180.

A stroke liquid chamber 182 is formed between the simulator piston 177 and the end wall 90*a* at the front end of the control piston 90. When the control piston 90 advances to its forward limit with respect to the backup piston 88, i.e., when the control piston 90 advances to the point where the end wall 90*a* abuts against the seat member 132, a plurality of ports 183 are provided in the end wall 90*a* of the control piston 90. The plurality of ports 183 are closed by the seat member 132. These ports 183 are opened to communicate the stroke liquid chamber 182 with the release chamber 135, and thus with the reservoir 40, when the control piston 90 retracts from its forward limit with respect to the backup piston 88.

Next, operation of this embodiment will be described. The tandem master cylinder M comprises the rear master piston 26 and front master piston 27 slidably housed in the casing 15, where the rear master piston 26 has its back turned to the boosted hydraulic pressure chamber 25, while the front master piston 27 forms the rear output hydraulic chamber 28 in conjunction with the rear master piston 26, and has its front face facing the front output hydraulic chamber 29. Also, the casing 15 slidably houses the backup piston 88 whose front face faces the boosted hydraulic pressure chamber 25, whose backward limit is fixed, and which is ready to push the rear master piston 26 directly from behind in response to operation of the brake pedal 11 when the hydraulic pressure of the boosted hydraulic pressure chamber 25 decreases. The hydraulic pressure of the boosted hydraulic pressure chamber 25 results from the output hydraulic pressure of the hydraulic power source 12 regulated by the hydraulic booster 13 according to brake operation via the brake pedal 11. The seal diameter of the rear master piston 26 on the casing 15 is set smaller than the seal diameter of the front master piston 27 on the casing 15.

Thus, the amount of volume change in the rear output hydraulic chamber 28 per stroke of the rear master piston 26 can be set to a relatively large value. Consequently, when pushing the rear master piston 26 directly by the backup piston 88 in response to decrease in the hydraulic pressure of the boosted hydraulic pressure chamber 25, it is possible to relatively increase the amount of operation of the brake pedal 11, i.e., the amount of change in the hydraulic pressure of the rear output hydraulic chamber 28 per stroke of the backup piston 88 and the rear master piston 26, thus increasing braking efficiency.

The backup piston 88 comprises the piston body 88*a* and pusher 88*b*, where the piston body 88*a* is slidably fitted in the casing 15 with substantially the same seal diameter as the seal diameter of the rear master piston 26, while the pusher 88*b* is slidably fitted in the casing 15 with a smaller seal diameter than the seal diameters of the rear master piston 26 and piston body 88*a* and coaxially extends to the front end of the piston body 88*a*, being ready to abut against and push the rear end of the rear master piston 26. The backup piston 88 also contains the pressure regulating means 89 formed between the backup piston 88 and casing 15 so as to communicate the hydraulic power source 12 with the axially opposite ends of the annular input chamber 96 sealed by the sealing members 93 and 95 which are interposed between the piston body 88*a* and casing 15 and between the pusher 88*b* and casing 15, respectively. Also, the pressure regulating means 89 forms part of the hydraulic booster 13, being interposed between the input chamber 96 and output chamber 106 so as to communicate the input chamber 96 with the output chamber 106 connected to the boosted hydraulic pressure chamber 25 and to communicate the output chamber 106 with the reservoir 40 when the output hydraulic pressure of the hydraulic power source 12 decreases. Consequently, when the pusher 88b pushes the rear master piston 26 forward, the amount of volume increase in the boosted hydraulic pressure chamber 25 is set to be substantially equal to the amount of volume decrease in the input chamber 96.

Since reduction in the hydraulic pressure of the input chamber 96, i.e., reduction in the hydraulic pressure of the hydraulic power source 12, causes reduction in the hydraulic force which presses the backup piston 88 toward the backward limit, it is possible to advance the backup piston 88 according to operation of the brake pedal 11, abut against the pusher 88b in the front part of the backup piston 88 against the rear master piston 26 with a clearance provided between the casing 15 and inner contact surface of the rear master piston 26, advance the rear master piston 26 in this state, thereby outputting the boosted brake fluid from the master cylinder M. When the backup piston 88 and rear master piston 26 move forward in this way, there is no increase in the hydraulic pressure of the boosted hydraulic pressure chamber 25, because the piston body 88a of the backup piston 88 is substantially equal in seal diameter to the rear master piston 26, because the amount of volume increase in the boosted hydraulic pressure chamber 25 is substantially equal to the amount of volume decrease in the input chamber 96 when the pusher 88b of the backup piston 88 pushes the rear master piston 26 in the forward direction, and because the boosted hydraulic pressure chamber 25 is communicated with the input chamber 96 via the pressure regulating means 89. This makes it possible to avoid increase in the hydraulic pressure of the boosted hydraulic pressure chamber 25 during forward movement of the backup piston 88 using a simple configuration with a reduced number of parts.

Also, since the spring 102 which urges the backup piston 88 and rear master piston 26 in a direction to separate them from each other is installed between the two pistons 88 and 26 whose fully retracted positions in the casing 15 are limited, it is possible to ensure an idle stroke according to reduction in the hydraulic pressure of the hydraulic power source 12 when advancing the backup piston 88 with the brake pedal 11.

Since the combined force of backward hydraulic pressure which acts on the backup piston 88 as the output hydraulic pressure of the hydraulic power source 12 acts on the input chamber 96 and the urging force of the spring 102 which urges the backup piston 88 in the backward direction is set to 300 to 1000 N, the backup piston 88 can be held stably at its fully retracted position when the hydraulic power source 12 is operating properly. That is, by urging the backup piston in the backward direction with a force of 300 N or more, it is possible to urge the backup piston 88 reliably in the backward direction taking into consideration the output hydraulic pressure of the hydraulic power source 12 and sliding resistance of the backup piston 88. Also, by urging the backup piston 88 in the backward direction with a force of not more than 1000 N, it is possible to prevent the rear master piston 26 from being pushed fully into the master cylinder M.

Incidentally, the normally closed linear solenoid valve 104 for automatic brake pressurization is interposed between the hydraulic power source 12 and the boosted hydraulic pressure chamber 25, while the normally open linear solenoid valve 108 for automatic brake depressurization and first one-way valve 110 are interposed between the output chamber 106 and boosted hydraulic pressure chamber 25, where the first one-way valve 110 is connected in parallel to the linear solenoid valve 108 for automatic brake depressurization to allow the brake fluid to flow from the output chamber 106 to the boosted hydraulic pressure chamber 25. Even when the brake pedal 11 is not operated and thus the pressure regulating means 89 is not operating, it is possible to perform automatic brake control in which the brake fluid is caused to act on the wheel brakes BA to BD in a non-braking situation by opening and closing the linear solenoid valve 104 for automatic brake pressurization and the linear solenoid valve 108 for automatic brake depressurization, thereby regulating the hydraulic pressure of the boosted hydraulic pressure chamber 25. Moreover, when the linear solenoid valve 108 for automatic brake depressurization is closed in automatic braking mode, it is possible to activate the pressure regulating means 89 by operating the brake pedal 11. Thus, if hydraulic pressure higher than that of the boosted hydraulic pressure chamber 25 is generated in the output chamber 106, the hydraulic pressure of the output chamber 106 can be caused to act on the boosted hydraulic pressure chamber 25 via the first one-way valve 110, to thereby operate the master cylinder M as during normal braking operations.

The normally closed pressure-reducing linear solenoid valve 105 for regeneration and coordination is interposed between the boosted hydraulic pressure chamber 25 and reservoir 40, while the normally open pressurizing linear solenoid valve 109 for regeneration and coordination and second one-way valve 111 are interposed between the output chamber 106 and boosted hydraulic pressure chamber 25, where the second one-way valve 111 is connected in parallel to the pressurizing linear solenoid valve 109 for regeneration and coordination to allow the brake fluid to flow from the boosted hydraulic pressure chamber 25 to the output chamber 106. Thus, during regeneration in a braking operation, by opening and closing the pressurizing linear solenoid valve 109 for regeneration and coordination and the pressure-reducing linear solenoid valve 105 for regeneration and coordination and thereby regulating the hydraulic pressure of the boosted hydraulic pressure chamber 25, it is possible to output brake hydraulic pressure from the master cylinder M in a state offset from that during a normal braking operation. By returning the brake pedal 11 with the pressurizing linear solenoid valve 109 for regeneration and coordination closed, it is possible to release the hydraulic pressure of the boosted hydraulic pressure chamber 25 to the reservoir 40 via the second one-way valve 111.

The casing 15 comprises the first cylinder body 16 into which the front master piston 27 fits slidably and the cylindrical sleeve 19 which is fitted and fastened in the first cylinder body 16 with the rear master piston 26 slidably fitted in it. Also, the sleeve 19 forms the annular release chamber 33 between itself and the first cylinder body 16, where the annular release chamber 33 is communicated with the reservoir 40. The annular piston-side sealing member 31 and sleeve-side sealing member 32, spaced axially, are interposed between the sleeve 19 and the rear master piston 26 which is slidably fitted in the sleeve 19. The communicating holes 36 are provided in the sleeve 19 so that the part between the axially opposite ends sealed with the sealing members 31 and 32 out of the part between the inner circumference of the sleeve 19 and outer circumference of the rear master piston 26 is communicated with the annular release chamber 33.

If the piston-side sealing member 31 fails to perform its sealing function, where the piston-side sealing member 31 is the one closer to the boosted hydraulic pressure chamber 25 out of the pair of sealing members 31 and 32 interposed between the sleeve 19 which forms part of the casing 15 and the rear master piston 26, the brake fluid in the boosted hydraulic pressure chamber 25 is returned to the reservoir 40, passing between the rear master piston 26 and sleeve 19 as well as between the communicating holes 36 and annular release chamber 33. In this process, the boosted hydraulic pressure becomes unavailable because the backup piston 88 directly pushes the rear master piston 26 in response to decrease in the hydraulic pressure of the boosted hydraulic pressure chamber 25, but two brake hydraulic systems connected to the tandem master cylinder M operate the wheel brakes BA to BD.

If the sleeve-side sealing member 32 closer to the rear output hydraulic chamber 28 out of the pair of sealing members 31 and 32 fails to perform its sealing function, the brake fluid in the rear output hydraulic chamber 28 is returned to the reservoir 40, passing between the rear master piston 26 and sleeve 19, as well as the communicating holes 36 and annular release chamber 33. In this case, brake hydraulic pressure is not available to the wheel brakes BA and BB of the brake hydraulic system connected to the rear output hydraulic chamber 28, but as the hydraulic pressure of the boosted hydraulic pressure chamber 25 acts on the rear master piston 26, the front master piston 27 can be operated with boosted pressure, and the brake hydraulic pressure boosted by the brake hydraulic system connected to the front output hydraulic chamber 29 can be applied to the wheel brakes BC and BD.

Thus, if one of the pair of sealing members 31 and 32 interposed between the sleeve 19 and rear master piston 26 fails to function, the wheel brakes BA to BD change their operating condition, to thereby clearly detect which of the sealing members 31 and 32 is damaged.

Also, since the piston-side sealing member 31, one of the sealing members 31 and 32, is mounted on the rear outer circumference of the rear master piston 26 while the other sealing member, i.e., the sleeve-side sealing member 32, is mounted on the inner circumference of the sleeve 19 so as to come into contact with the front outer circumference of the rear master piston 26 located at its fully retracted position, the pair of sealing members 31 and 32 can be interposed between the rear master piston 26 and sleeve 19 while avoiding increase in the axial length of the sleeve 19 and thus increase in the axial length of the casing 15 regardless of the stroke of the rear master piston 26.

Furthermore, in a non-braking situation, the rear master piston 26 is urged backward by the rear return spring 57 with its distance from the closed front end of the casing 15 kept to a predetermined maximum distance by the maximum distance limiting means 53 and 68. In this state, the clearance 92 is formed between the rear end of the rear master piston 26 and front end of the backup piston 88 at its fully retracted position so as to make the rear master piston 26 approach the backup piston 88 from ahead and oppose it. This clearance 92 can absorb axial deviations of the master cylinder M and backup piston 88, to thereby avoid compressing the front return spring 74 which urges the front master piston 27 backward and the rear return spring 57 which urges the rear master piston 26 backward in excess of their set loads, and thus avoid increasing an idle stroke of the brake pedal 11.

Moreover, since the spring 102 smaller in spring load than the rear return spring 57 is mounted under compression between the backup piston 88 and rear master piston 26 so as to urge the rear master piston 26 forward, it is possible to maintain the clearance 92 between the rear master piston 26 and backup piston 88 while keeping the rear and front master pistons 26 and 27 from moving in a direction to abut against the backup piston 88 when the brake pedal 11 is not operated.

The hydraulic booster 13 comprises the backup piston 88, the control valve means 89 contained in the backup piston 88, the control piston 90 which makes the control valve means 89 regulate pressure so as to achieve a balance between the reaction force generated by the hydraulic pressure of the boosted hydraulic pressure chamber 25 and the brake operating force inputted from the brake pedal 11 via the brake stroke simulator 14, and the reaction means 91 placed between the control valve means 89 and control piston 90. The control valve means 89 comprises the booster valve 116 and the pressure-reducing valve 117, where the booster valve 116 is interposed between the control-side liquid chamber 130 connected to the boosted hydraulic pressure chamber 25 and hydraulic power source 12 so as to open when the control piston 90 advances and close when the control piston 90 retracts, while the pressure-reducing valve 117 is interposed between the control-side liquid chamber 130 and reservoir 40 so as to close when the control piston 90 advances and open when the control piston 90 retracts. The control piston 90 is relatively slidably fitted in the backup piston 88 and is coaxially connected with the rear end of the reaction means 91 whose front end faces the control-side liquid chamber 130 formed in the backup piston 88. The valve housing 118 is fitted and fastened in the backup piston 88 ahead of the reaction means 91. The pressure-reducing valve 117 comprises the pressure-reducing valve seat 146 and poppet-type pressure-reducing valve disc 160, where the pressure-reducing valve seat 146 is installed on the reaction means 91, forming the pressure-reducing valve hole 145 which is communicated with the reservoir 40 when the pressure-reducing valve 117 retracts, while the poppet-type pressure-reducing valve disc 160 is housed in the valve housing 118, being spring-urged backward to the backward limit. The booster valve 116 comprises the booster valve seat 150 and the poppet-type booster valve disc 151, where the booster valve seat 150 is installed in the valve housing 118, forming the booster valve hole 163 which is communicated with the control-side liquid chamber 130 and ready to accept the rod portion 160a of the pressure-reducing valve disc 160, while the poppet-type booster valve disc 151 is installed in the valve housing 118, being spring-urged backward and ready to be pushed forward by the front end of the pressure-reducing valve disc 160.

Thus, the control valve means 89 consisting of the control piston 90, reaction means 91, booster valve 116, and pressure-reducing valve 117 can be preinstalled in the backup piston 88 slidably housed in the casing 15, making it easier to assemble the control piston 90, reaction means 91, and control valve means 89 to the casing 15.

Since the sealing area obtained when the booster valve disc 151 is seated on the booster valve seat 150 is set substantially equal to the pressure receiving area on the front end of the booster valve disc 151 subjected to the hydraulic pressure of the boosted hydraulic pressure chamber 25, the hydraulic forces acting on the opposite ends of the poppet-type booster valve disc 151 of the booster valve 116 are substantially equal, and thus the poppet-type booster valve disc 151 operates so as to balance the valve opening force acting on the booster valve disc 151 from the rod portion 160a of the pressure-reducing valve disc 160 of the pressure-reducing valve 117 with the spring force urging the poppet-type booster valve disc 151 backward, thereby improving operational performance of the booster valve 116. The spring force which urges the poppet-type booster valve disc 151 backward is sufficient to be a weak force for the poppet-type booster valve disc 151 to follow the pressure-reducing valve disc 160, and the spring force which urges the pressure-reducing valve disc 160 backward is also sufficient to be a weak force for the pressure-reducing valve disc 160 to follow the reaction means 91, resulting in a very weak spring force acting on the reaction means 91. Thus, the reaction force acting on the reaction means 91 is almost entirely attributable to the hydraulic pressure of the boosted hydraulic pressure chamber 25 to improve the reaction feeling.

The valve housing 118 is fitted and fastened in the backup piston 88 by being sandwiched between the shoulder 121 provided on the backup piston 88 to face the front and the presser member 122 screwed into the backup piston 88. Also, the communicating hole 155 is provided in the presser member 122 to communicate the hydraulic chamber 154 with the boosted hydraulic pressure chamber 25, where the hydraulic chamber 154 is formed between the presser member 122 and the valve housing 118 to face the rod portion 151a of the booster valve disc 151. This makes it easier to configure a hydraulic channel used to apply the hydraulic pressure of the boosted hydraulic pressure chamber 25 to the front end of the poppet-type booster valve disc 151.

As described above, the hydraulic booster 13 comprises the backup piston 88 which can directly push the rear master piston 26 in response to operation of the brake pedal 11 when the hydraulic pressure of the boosted hydraulic pressure chamber 25 decreases, and the control piston 90 and brake stroke simulator 14 are contained in the backup piston 88. Thus, the hydraulic booster 13 can be assembled to the casing 15 with the brake stroke simulator 14 incorporated in the backup piston 88 and connected to the control piston 90, thereby improving the efficiency in assembling.

Moreover, the brake stroke simulator 14 is contained in the control piston 90. This reduces the total axial length of the hydraulic booster 13 and brake stroke simulator 14. Also, even if the brake stroke simulator 14 malfunctions, brake operating force can be inputted to the control piston 90 from the brake pedal 11 via the brake stroke simulator 14.

The control piston 90 is formed into a bottomed cylindrical shape with the end wall 90a at its front end. The brake stroke simulator 14 comprises: an input piston 174 linked to the brake pedal 11; a simulator piston 177 which is slidably fitted in the control piston 90 to form a stroke liquid chamber 182 between itself and the end wall 90a of the control piston 90, and is coupled to the input piston 174; and an elastic body 175 and a coil spring 176 installed between the input piston 174 and the control piston 90. Ports 183 which are closed by the seat member 134 when the control piston 90 advances through a predetermined travel distance or more toward the backup piston 88, are provided in the end wall 90a of the control piston 90 so as to communicate the stroke liquid chamber 182 with a reservoir 40 when they are open.

Thus, when the ports 183 in the control piston 90 are closed as the control piston 90 advances through a predetermined travel distance or more toward the backup piston 88, the stroke liquid chamber 182 is hermetically sealed, limiting the forward travel of the simulator piston 177 toward the control piston 90. This makes it easy to limit a forward travel end of the simulator piston 177 with respect to the control piston 90 without installing a high-strength limiting part. This makes it possible to curb increase in a stroke and reaction of the brake pedal 11 which would be invalidated by a brake stroke simulator 14 when a hydraulic power source 12 fails.

Figure 7:
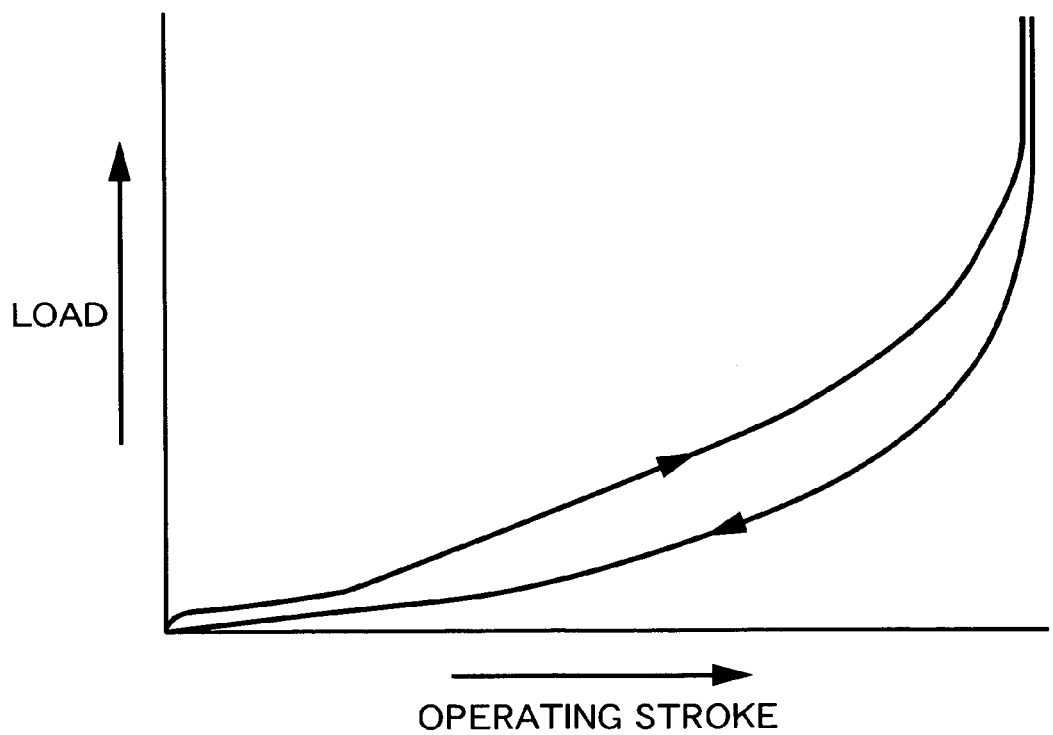
FIG. 7 is diagram showing operating characteristics of the brake stroke simulator.

The brake operating force applied to the input piston 174 by the brake pedal 11 is transmitted to the control piston 90 via the elastic body 175 and the coil spring 176 connected in series via the simulator piston 177. The coil spring 176 is smaller in spring constant than the elastic body 175. Thus, as shown in FIG. 7, in a region where brake operating load is small, the operating load changes moderately with respect to the amount of change in the operating stroke of the brake pedal 11, since the brake pedal 11 is pressed down against the spring force of the coil spring 176; but in a region where the brake operating load is large, the operating load changes comparatively greatly with respect to the amount of change in the operating stroke of the brake pedal 11, since the brake pedal 11 is pressed down against the spring force of the elastic body 175.

Besides, since the elastic body 175 is formed into a cylindrical shape so that it will come into resilient contact with the inner circumference of the control piston 90 by expanding its diameter under an axial compressive force produced by forward movement of the input piston 174, when pressing down the brake pedal 11, the brake pedal 11 must be operated with such an operating force that overcomes the sum of the resilient force of the elastic body 175 and the frictional force between the elastic body 175 and control piston 90. However, when relaxing the brake operating force, the frictional force acts on the brake pedal 11 in the direction opposite to the returning direction of the brake pedal 11, while the elastic body 175 remains in sliding contact with the inner circumference of the control piston 90. Thus, the brake stroke simulator 14 can increase hysteresis width in relationship between brake operating stroke and operating load as shown in FIG. 7, thereby reducing the driver's burden.

Since the elastic body 175 is preloaded with the coil spring 176, even if the elastic body 175 loses elasticity, the loss of elasticity is absorbed by the coil spring 176, and it is possible to eliminate a feel of an idle stroke during a normal braking operation and obtain two-step operating simulation characteristics using the elastic body 175 and the coil spring 176 irrespective of the loss of elasticity of the elastic body 175.

Reaction means 91 consists of a first reaction piston 126 whose rear end constantly abuts against the closed front end of the control piston 90, and a second reaction piston 127 whose rear end abuts against the closed front end of the control piston 90, when the control piston 90 advances through a predetermined travel distance or more toward the backup piston 88. The first and second reaction pistons 126 and 127 are relatively slidably mounted on the backup piston 88, to form part of the hydraulic booster, in order for hydraulic pressure of the boosted hydraulic pressure chamber 25 to act on their front ends. When the hydraulic power source 12 is operating normally with the hydraulic pressure of the boosted hydraulic pressure chamber 25 at a low level, even if spikes are inputted from the brake pedal 11, the control piston 90 is abutted by the rear ends of the first and second reaction pistons 126 and 127 before the ports 183 in the end wall 90a of the control piston 90 are closed, thereby increasing the reaction force acting on the control piston 90. This prevents the ports 183 from being closed, and thus prevents the brake stroke simulator 14 from being locked erroneously, thereby avoiding an insufficient stroke of the brake pedal 11.

When the booster valve 116 is open, the brake fluid in the input-side liquid chamber 143 flows through a booster channel 152 into the control-side liquid chamber 130. The inflow of the brake fluid is controlled by the flow control valve 165 which varies the orifice area of the booster channel 152 opening to the control-side liquid chamber 130 according to the difference in the hydraulic pressure between the booster channel 152 and control-side liquid chamber 130. When the pressure-reducing valve 117 is open, the brake fluid in the control-side liquid chamber 130 flows out to the release-side liquid chamber 157 through the pressure-reducing flow channel 159. The outflow of the brake fluid is controlled by a flow control valve 168 which varies the orifice area of the pressure-reducing flow channel 159 opening to the release-side liquid chamber 157 according to the difference in the hydraulic pressure between the pressure-reducing flow channel 159 and release-side liquid chamber 157.

Thus, when the high-pressure hydraulic fluid flows into the lower-pressure liquid chambers 130 and 157 from the respective higher-pressure liquid chambers 143 and 130 via the respective flow channels 152 and 159 upon opening of the booster valve 116 and pressure-reducing valve 117, the flow control valves 165 and 168 baffle the hydraulic fluid and control its flow rate. This prevents an abrupt pressure change in the hydraulic fluid flowing into the lower-pressure liquid chambers 130 and 157 from the flow channels 152 and 159, as well as reduces operating noise and pulsating noise resulting from operation of the booster valve 116 and the pressure-reducing valve 117.

Also, the valve discs 164 and 169 of the flow control valves 165 and 168 are slidably supported by the rod portion 160a and the support shaft 170a extending linearly and coaxial with the flow channels 152 and 159, and are spring-urged in a direction to close those ends of the flow channels 152 and 159 which are open to the respective lower-pressure liquid chambers 130 and 157. This configuration can prevent self-excited vibration of the valve discs 164 and 169, thereby preventing noise caused by self-excited vibration.

Furthermore, the booster valve 116 interposed between the input-side liquid chamber 143 and the control-side liquid chamber 130, comprises the booster valve seat 150 and the booster valve disc 151, where the middle part of the booster valve seat 150 faces the end of the booster channel 152 which is open to the input-side liquid chamber 143, while the booster valve disc 151 is housed in the input-side liquid chamber 143 being spring-urged in a direction to be seated on the booster valve seat 150. The pressure-reducing valve 117 is interposed between the release-side liquid chamber 157 and the control-side liquid chamber 130 so as to close when the booster valve 116 opens. The pressure-reducing valve 117 comprises the pressure-reducing valve disc 160 housed in the control-side liquid chamber 130 so as to be able to reciprocate coaxially with the booster channel 152. The rod portion 160a which abuts against and pushes the booster valve disc 151 in the opening direction is integrally mounted on the pressure-reducing valve disc 160. Thus, when controlling the hydraulic pressure of the control-side liquid chamber 130 by opening and closing the booster valve 116 and the pressure-reducing valve 117, since the valve disc 164 of the flow control valve 165 is supported by the rod portion 160a which is integral with the pressure-reducing valve disc 160 of the pressure-reducing valve 117 and operates the booster valve 116 to close, it is possible to reduce the number of parts to reduce the size of the entire hydraulic booster 13.

Next, a second embodiment of the present invention will be described with reference to FIGS. 8 to 12. Components corresponding to those in the first embodiment are denoted by the same reference numerals as those in the first embodiment and detailed description thereof will be omitted.

Figure 8:
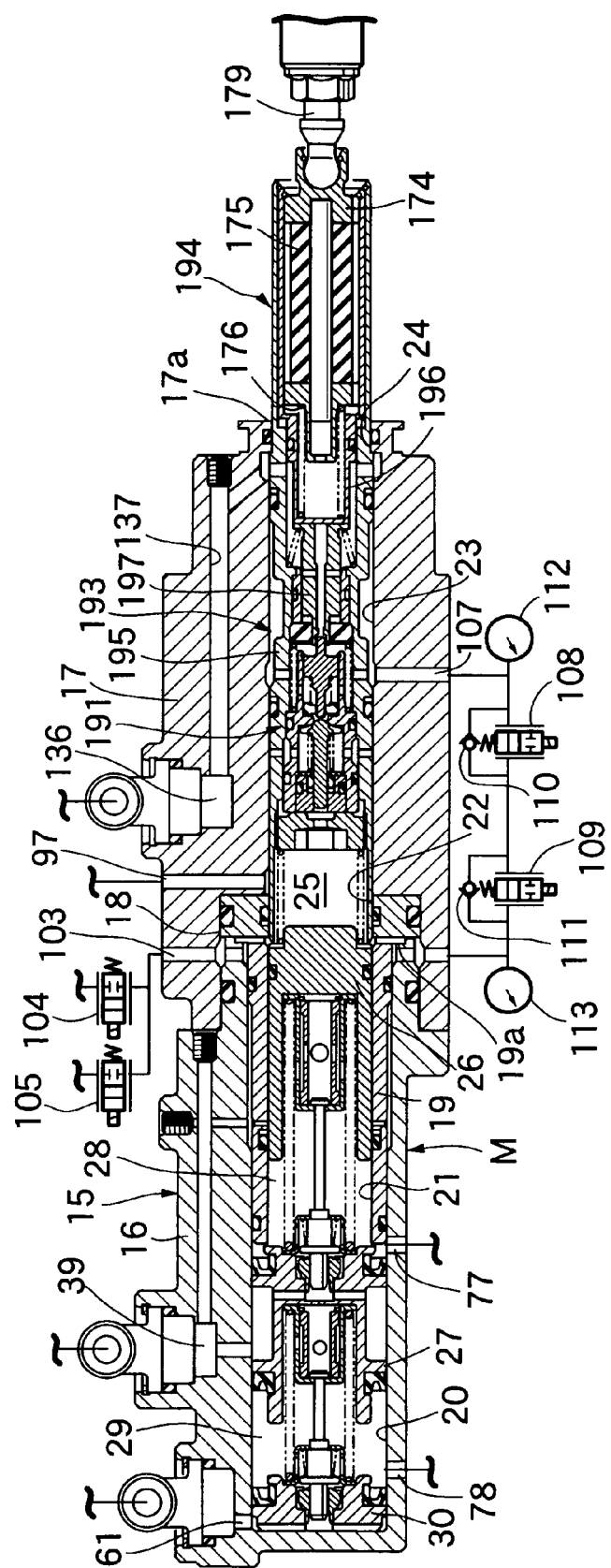
FIG. 8 is a longitudinal sectional view of a master cylinder, hydraulic booster, and brake stroke simulator, according to a second embodiment of the present invention.

Referring first to FIG. 8, a braking system for a four-wheeled vehicle comprises: a tandem master cylinder M, a hydraulic booster 193 which regulates hydraulic pressure of a hydraulic power source 12 according to a brake operating force inputted from a brake pedal 11, and which applies the hydraulic pressure to the master cylinder M; and a brake stroke simulator 194 interposed between the brake pedal 11 and hydraulic booster 193.

Figure 9:
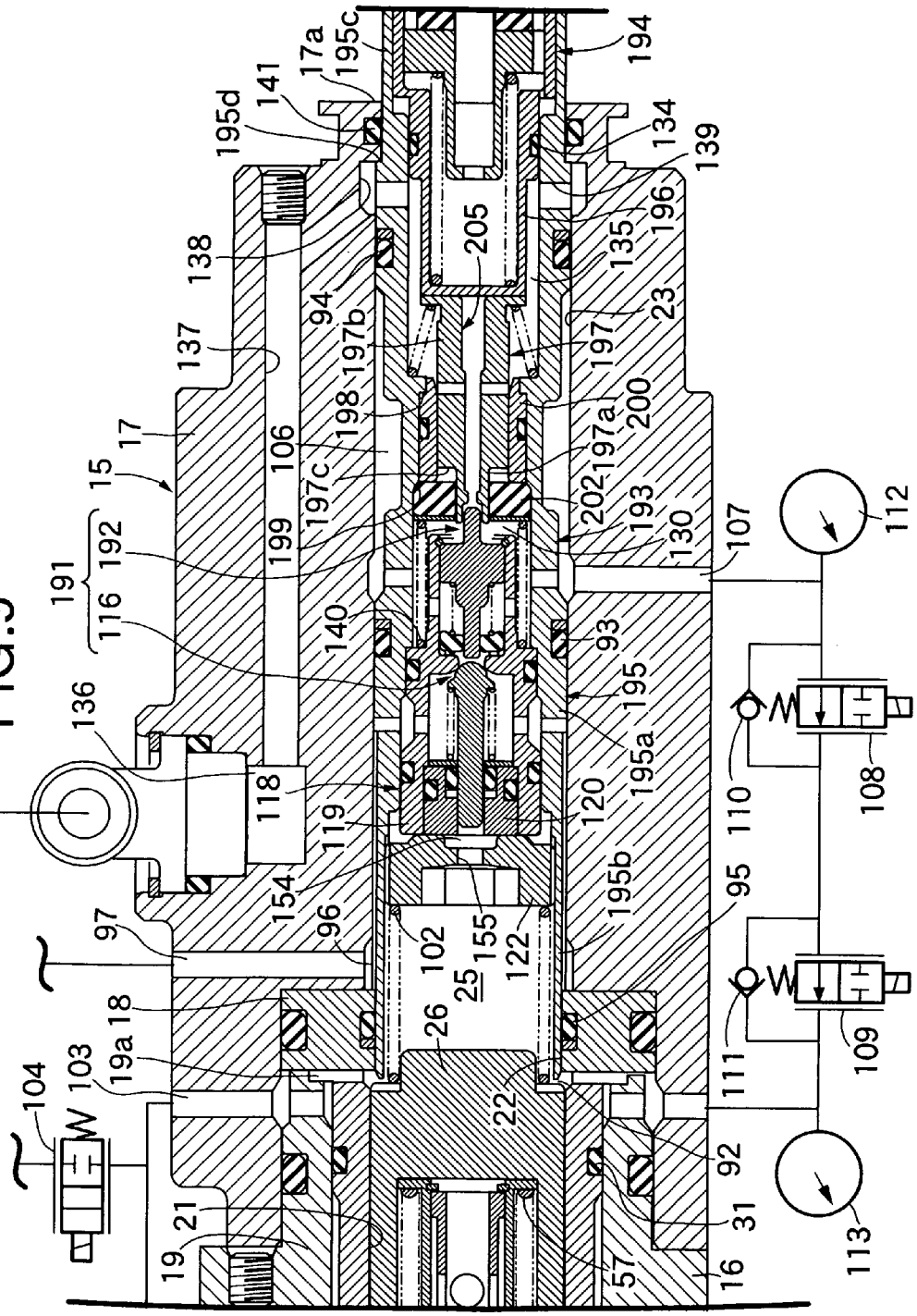
FIG. 9 is an enlarged longitudinal sectional view of the hydraulic booster.

Referring also to FIG. 9, the hydraulic booster 193 comprises: a backup piston 195 which has a stepped cylindrical shape and is slidably housed in the casing 15 with its front face turned to the boosted hydraulic pressure chamber 25; a pressure controlling means 191 contained in the backup piston 195; a control piston 196 which makes the pressure controlling means 191 regulate pressure so as to achieve a balance between the reaction force caused by the hydraulic pressure of the boosted hydraulic pressure chamber 25 and the brake operating force inputted from the brake pedal 11 via the brake stroke simulator 194; and a reaction piston 197 serving as reaction means placed between the pressure controlling means 191 and the control piston 196.

The backup piston 195 integrally comprises: a piston body 195a which slidably fits in the fourth cylinder hole 23; a cylindrical pusher 195b which is coaxially and integrally linked to the front end of the piston body 195a by slidably penetrating the third cylinder hole 22; and a cylindrical extension tube 195c which is coaxially and integrally linked to the rear end of the piston body 195a and extends beyond the casing 15 by slidably penetrating the fifth cylinder hole 24. The pusher 195b pushes the rear master piston 26 by directly abutting against the rear end of the rear master piston 26.

On the outer circumference of the backup piston 195, near its rear end, a limiting shoulder 195d is formed between the piston body 195a and the extension tube 195c. The limiting shoulder 195d defines the fully retracted position of the backup piston 195 within the casing 15, as it abuts against the inward flange 17a at the rear end of the second cylinder body 17 in the casing 15 from ahead.

Annular sealing members 93 and 94, spaced axially, are mounted on the outer circumference of the piston body 195a of the backup piston 195, and placed resiliently in sliding contact with the inner circumference of the fourth cylinder hole 23. An annular sealing member 95 is mounted on the inner circumference of the separator 18, and placed resiliently in sliding contact with the pusher 195b of the backup piston 195. Thus, the pusher 195b, which has a seal diameter smaller than seal diameters of the rear master piston 26 and piston body 195a, fits slidably in the third cylinder hole 22 of the casing 15.

An input chamber 96 is formed between the second cylinder body 17 and the backup piston 195 in the casing 15, and the axially opposite ends of the input chamber 96 are sealed by the annular sealing member 93 nearer the front out of the two annular sealing members 93 and 94 mounted on the outer circumference of the piston body 195a, and by the annular sealing member 95 mounted on the inner circumference of the separator 18. The input chamber 96 is communicated with an input port 97 provided in the second cylinder body 17. The input port 97 is communicated with a hydraulic power source 12 (see FIG. 1 in the first embodiment). When the pusher 195b of the backup piston 195 pushes the rear master piston 26 of the master cylinder M, the volume increase of the boosted hydraulic pressure chamber 25 is substantially equal to the volume decrease of the input chamber 96.

Figure 10:
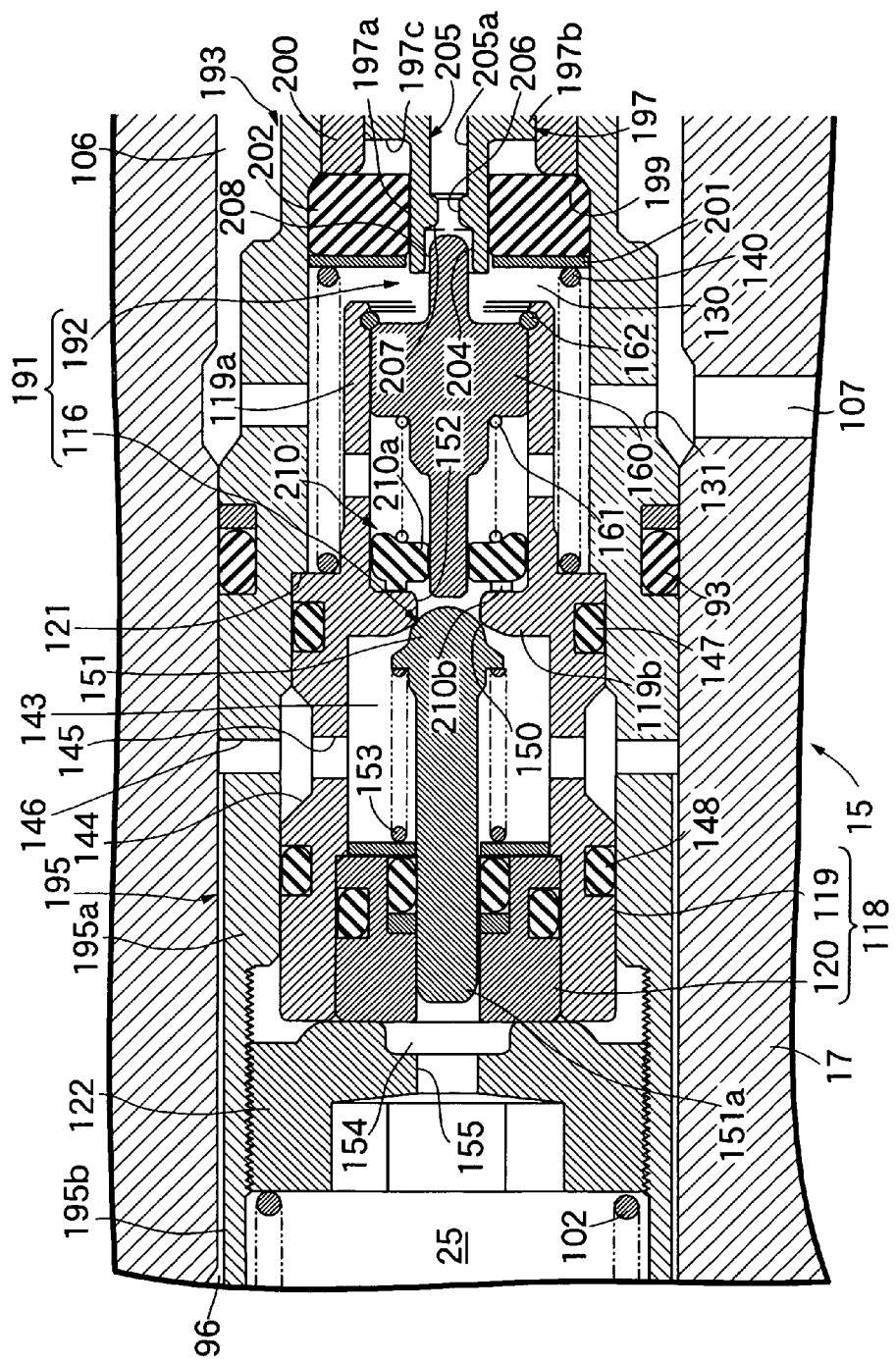
FIG. 10 is an enlarged view of a main part of FIG. 9.

Referring also to FIG. 10, the pressure controlling means 191 consists of a booster valve 116 and pressure-reducing valve 192. The pressure controlling means 191 is contained in the piston body 195a of the backup piston 195, and can provide communication between the input chamber 96 and the output chamber 106, and between the first oil sump 41 of the reservoir 40 and the output chamber 106, when the output hydraulic pressure of the hydraulic power source 12 decreases.

Beyond the valve housing 118 fitted and fastened in the piston body 195a of the backup piston 195, an engagement shoulder 198 facing the valve housing 118 as well as an annular engagement shoulder 199 placed between the engagement shoulder 198 and the valve housing 118 to face the valve housing 118, are provided on an inner surface of the piston body 195a of the backup piston 195. The engagement shoulder 198 is abutted by, and engaged with, the outer circumference of the rear end of a cylindrical sleeve 200 fitted liquid-tight in the piston body 195a. The front end of the sleeve 200 is placed to be flush with the annular engagement shoulder 199.

The front ends of the engagement shoulder 199 and the sleeve 200 are abutted by the outer peripheral part of the rear face of an annular elastic member 202 whose front face is in contact with a plate retainer 201. Also, a spring 140 is mounted under compression between the valve housing 118 and the front face of the retainer 201. Consequently, the faces of the elastic member 202 are held between the front ends of the engagement shoulder 199 and the sleeve 200 and the rear face of the retainer 201.

In the piston body 195a of the backup piston 195, a control-side liquid chamber 130 is formed between the valve housing 118 and the retainer 201 in contact with the elastic member 202, to exert hydraulic pressure on a surface of the elastic member 202. The control-side liquid chamber 130 is communicated with the output chamber 106 via a plurality of communicating holes 131 provided in the piston body 195a.

Figure 11:
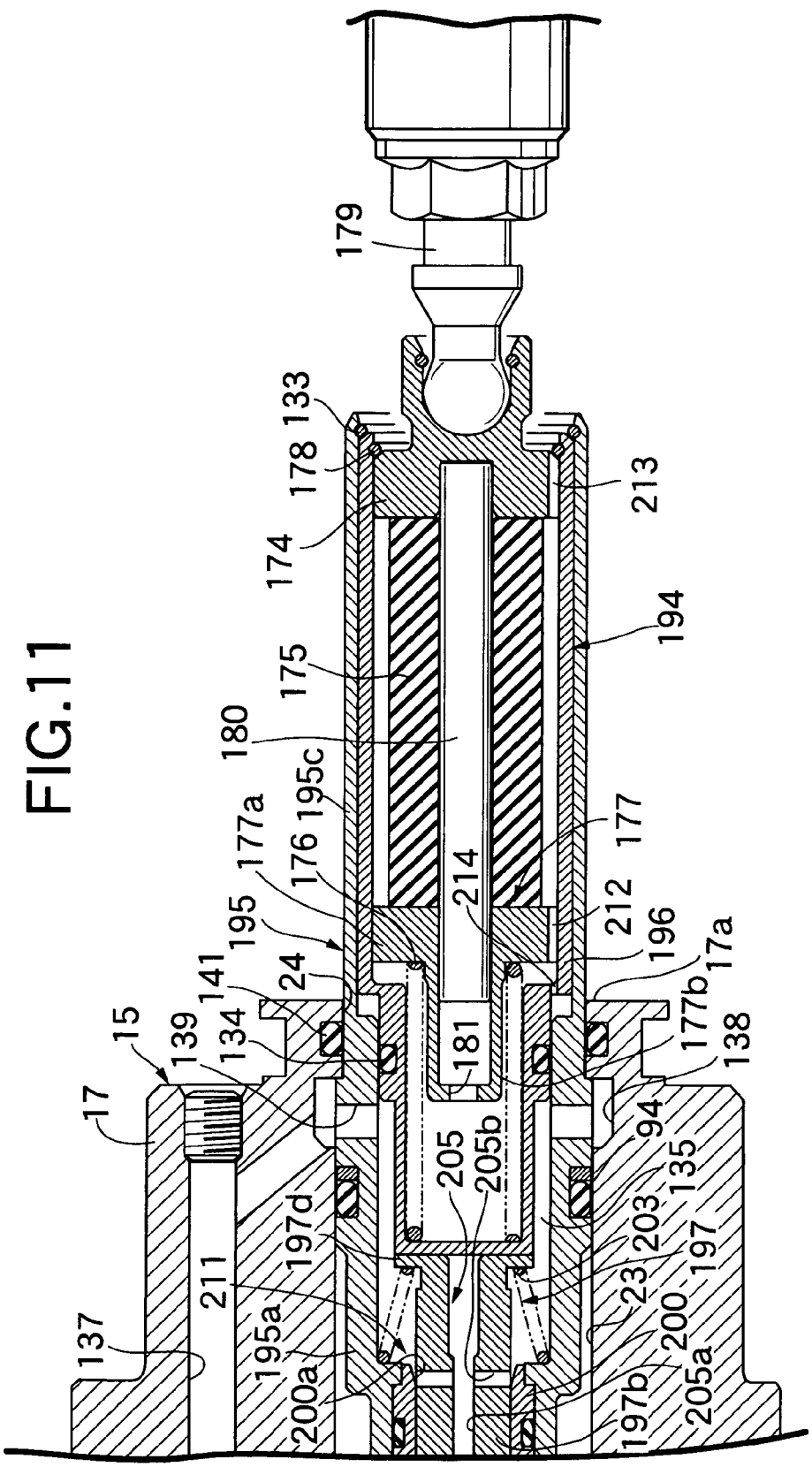
FIG. 11 is an enlarged longitudinal sectional view of the brake stroke simulator.

Referring also to FIG. 11, the control piston 196 is formed into a stepped closed-end tube with its front end closed, and is relatively slidably fitted in the rear parts of the extension tube 195c and the piston body 195a of the backup piston 195. A snap ring 133 is fitted in the rear end of the extension tube 195c of the backup piston 195 to abut against the rear end of the control piston 196, thereby preventing the control piston 196 from coming off from the backup piston 195.

In the rear part of the piston body 195a, a release chamber 135 which is sealed from outside by a sealing member 134 is formed, facing the front end of the control piston 196, where the sealing member 134 is mounted on the front outer circumference of the control piston 196, and comes into resilient contact with the rear inner circumference of the piston body 195a of the backup piston 195. Besides, the backup piston 195 is equipped with a plurality of communicating holes 139 to keep the release chamber 135 communicated with an annular recess 138 provided in the second cylinder body 17 in the casing 15 so as to open to an inner surface of the fourth cylinder hole 23. The annular recess 138 is sealed both from ahead and behind by the annular sealing member 94 mounted on the outer circumference of the backup piston 195 and an annular sealing member 141 mounted on an inner surface of the fifth cylinder hole 24, and placed in sliding contact with the outer circumference of the extension tube 195c of the backup piston 195.

The reaction piston 197 integrally comprises a small-diameter piston portion 197a whose front end faces the control-side liquid chamber 130, and a large-diameter piston portion 197b coaxially extending to the rear end of the small-diameter piston portion 197a by forming an annular shoulder 197c, which faces the control-side liquid chamber 130, between itself and the small-diameter piston portion 197a. The small-diameter piston portion 197a liquid-tightly and slidably penetrates the elastic member 202 and axially slidably penetrates the retainer 201, while the large-diameter piston portion 197b is slidably fitted in the sleeve 200.

When the hydraulic pressure of the control-side liquid chamber 130 which acts on the front face of the elastic member 202 reaches a predetermined value, the inner peripheral part of the rear face of the elastic member 202 receiving a liquid pressure of the control-side liquid chamber 130, is deformed and pressed against the annular shoulder 197c of the reaction piston 197.

The rear end of the reaction piston 197 coaxially abuts against the front end of the control piston 196. A spring 203 whose spring force causes the reaction piston 197 to abut against the front end of the control piston 196 is mounted under compression between a flange 197d, provided on the rear end of the reaction piston 197, and the backup piston 195. The spring force of the spring 203 is set to be a weak force sufficient for the control piston 196 to follow the reaction piston 197.

The reaction piston 197 is equipped with an insertion hole 204 which has its front end communicated with the control-side liquid chamber 130 and extends coaxially with the control-side liquid chamber 130, and a through-hole 205 including a shaft hole 205a coaxial with the insertion hole 204 and communicated with the release chamber 135. A flange-shaped pressure-reducing valve seat 207 sticks out radially outward between the insertion hole 204 and shaft hole 205a to form a pressure-reducing flow channel 206 coaxial with the insertion hole 204 and through-hole 205.

The pressure-reducing valve 192 is composed of the pressure-reducing valve seat 207 and a poppet-type pressure-reducing valve disc 160 which is placed ahead of the reaction piston 197 to allow its rear end to be seated on the valve seat 146 and which is spring-urged backward with its backward limit fixed. The rear part of the pressure-reducing valve disc 160 is inserted coaxially into the insertion hole 204 to form an annular orifice 208 in front of the pressure-reducing valve seat 207 between itself and the reaction piston 197.

The pressure-reducing valve disc 160 is held axially slidably in the control-side liquid chamber 130 by the guide tube 119a of the housing body 119 of the valve housing 118. Also, a baffling member 210 which serves as a baffling means axially movably penetrated by the front part of the pressure-reducing valve disc 160 is housed in the guide tube 119a, forming a front end wall of the guide tube 119a and abutting against an inward flange 119b provided on the housing body 119 of the valve housing 118. Besides, a pressure-reducing valve spring 161 which urges the pressure-reducing valve disc 160 backward is mounted under compression between the baffling member 210 and the pressure-reducing valve disc 160.

A throttle mechanism 211 serving as a baffling means is provided between the reaction piston 197 and the sleeve 200 whose rear end faces the release chamber 135. The throttle mechanism 211 passes the brake fluid through the through-hole 205 to the release chamber 135 at full throttle when the brake pedal 11 and thus the reaction piston 197 are inoperative, but limits passage of the brake fluid through the through-hole 205 to the release chamber 135 when the reaction piston 197 is operated via the brake pedal 11.

The through-hole 205 is composed of the shaft hole 205a and a plurality of caves 205b, where the shaft hole 205a is provided in the reaction piston 197 with its front end communicated with the pressure-reducing flow channel 206 and its rear end closed at the front end of the control piston 196, while the caves 205b extend to the middle part of the shaft hole 205a and open to an outer surface of the reaction piston 197. The throttle mechanism 211 is composed of the sleeve 200 and the caves 205b.

An expanded diameter portion 200a which widens toward the open end is formed in the inner circumference of the rear end of the sleeve 200.

The booster valve 116 has the same configuration as the corresponding component according to the first embodiment. When the booster valve 116 is open, the brake fluid in the valve chamber 143 communicated with the hydraulic power source 12 flows into the control-side liquid chamber 130 through a booster flow channel 152. The baffling member 210 is placed near the booster flow channel 152 in the control-side liquid chamber 130. The baffling member 210 is axially movably penetrated by the pressure-reducing valve disc 160, and urged by the pressure-reducing valve spring 161 so as to be placed in contact with the inward flange 119b.

The baffling member 210 comprises a disk 210a placed to face the inward flange 119b with its center axially movably penetrated by the pressure-reducing valve disc 160, and a plurality of protrusions 210b sticking out from the disk 210a so as to abut against the inward flange 119b. The brake fluid flowing into the control-side liquid chamber 130 through the booster flow channel 152 changes flow direction upon hitting the disk 210a. Then, the brake fluid is baffled so as to flow radially between the disk 210a and inward flange 119b, and flows into the control-side liquid chamber 130.

In the hydraulic booster 193, as brake operating input from the brake pedal 11 is entered the control piston 196 via the brake stroke simulator 194, pressing force of the control piston 196 acts forward on the reaction piston 197. Consequently, the reaction piston 197 moves forward, causing the pressure-reducing valve disc 160 to be seated on the pressure-reducing valve seat 207. As a result, the pressure-reducing valve 192 closes, to block the control-side liquid chamber 130 from the reservoir 40. Then, when the control piston 196, reaction piston 197, and pressure-reducing valve disc 160 advance further, the booster valve disc 151 is lifted from the booster valve seat 150, opening the booster valve 116, and thus causing output hydraulic pressure of the hydraulic power source 12 to act on the control-side liquid chamber 130. When the pressure-reducing valve 192 remains closed, the hydraulic pressure of the control-side liquid chamber 130, i.e., the boosted hydraulic pressure chamber 25, is acting on the front part of the reaction piston 197, the reaction piston 197 and control piston 196 retract to achieve a balance between the brake operating input from the brake pedal 11 and hydraulic force produced by the hydraulic pressure of the control-side liquid chamber 130. Consequently, the pressure-reducing valve 192 opens, and the booster valve 116 closes. As the booster valve 116 and pressure-reducing valve 192 repeat opening and closing, the output hydraulic pressure of the hydraulic power source 12 is regulated to be a boosted hydraulic pressure corresponding to the brake operating input from the brake pedal 11, and is applied to the control-side liquid chamber 130, and thus to the boosted hydraulic pressure chamber 25.

The brake stroke simulator 194 comprises an input piston 174 housed axially slidably in the control piston 196, as well as an elastic body 175 and coil spring 176 interposed in series between the input piston 174 and control piston 196. The brake stroke simulator 194 is housed in the control piston 196 and opens the control piston 196 to the atmosphere.

The input piston 174 is slidably fitted in the front end of the control piston 196 with its fully retracted position defined by a snap ring 178 mounted on the rear part of the control piston 196, and is connected swingably with the front end of an input rod 179 linked to the brake pedal 11. Thus, a brake operating force corresponding to the operation of the brake pedal 11 is inputted in the input piston 174 via the input rod 179, and the input piston 174 moves forward according to the brake operating force.

The front part of the guide shaft 180 press-fitted and fastened in the center of the input piston 174 is slidably fitted in the bottomed cylindrical portion 177b of the intermediate transmitting member 177 interposed between the input piston 174 and the control piston 196. Also, to open the control piston 196 to the atmosphere, a release groove 212 is provided in the outer circumference of the disc portion 177a of the intermediate transmitting member 177, and a release groove 213 is provided in the outer circumference of the input piston 174. Furthermore, behind the sealing member 134 which is mounted on the outer circumference of the control piston 196 and placed in sliding contact with the inner circumference of the extension tube 195c of the backup piston 195, a slit 214 is provided in the control piston 196 to eliminate any sealed space between the control piston 196 and the backup piston 195.

According to the second embodiment, the hydraulic booster 193 comprises: a backup piston 195; a pressure controlling means 191 contained in the backup piston 195; a control piston 196 which makes the pressure controlling means 191 regulate pressure so as to achieve a balance between the reaction force caused by the hydraulic pressure of the boosted hydraulic pressure chamber 25 and the brake operating force inputted from the brake pedal 11 via the brake stroke simulator 194; and a reaction piston 197 placed between the pressure controlling means 191 and control piston 196. The pressure controlling means 191 comprises the booster valve 116 and the pressure-reducing valve 192. The booster valve 116 is interposed between the control-side liquid chamber 130 connected to the boosted hydraulic pressure chamber 25 and the hydraulic power source 12 so as to open when the control piston 196 advances and to close when the control piston 196 retracts, while the pressure-reducing valve 192 is interposed between the control-side liquid chamber 130 and the reservoir 40 so as to close when the control piston 196 advances and to open when the control piston 196 retracts. The control piston 196 is relatively slidably fitted in the backup piston 195, and is coaxially connected with the rear end of the reaction piston 197 whose front end faces the control-side liquid chamber 130 formed in the backup piston 195. The valve housing 118 is fitted and fastened in the backup piston 195 ahead of the reaction piston 197. The pressure-reducing valve 192 comprises the pressure-reducing valve seat 207 and the poppet-type pressure-reducing valve disc 160, where the pressure-reducing valve seat 207 is installed on the reaction piston 197 to form the pressure-reducing flow channel 206 which is communicated with the reservoir 40 at the time of retraction, while the poppet-type pressure-reducing valve disc 160 is housed in the valve housing 118, being spring-urged backward with its backward limit fixed. The booster valve 116 comprises the booster valve seat 150 and the poppet-type booster valve disc 151, where the booster valve seat 150 is installed in the valve housing 118 to form the booster flow channel 152 which is communicated with the control-side liquid chamber 130 and which receives the front end of the pressure-reducing valve disc 160, while the poppet-type booster valve disc 151 is installed in the valve housing 118, being spring-urged backward to be pushed forward by the front end of the pressure-reducing valve disc 160.

Thus, the pressure controlling means 191 consisting of the control piston 196, reaction piston 197, booster valve 116, and pressure-reducing valve 192 can be installed in advance in the backup piston 195 slidably housed in the casing 15, making it easier to assemble the control piston 196, reaction piston 197, and pressure controlling means 191 to the casing 15.

The reaction piston 197 comprises the small-diameter piston portion 197a whose front end faces the control-side liquid chamber 130, and the large-diameter piston portion 197b coaxially and inseparably extending to the rear end of the small-diameter piston portion 197a via the annular shoulder 197c which faces the control-side liquid chamber 130. The pressure-reducing valve seat 207 is installed on the reaction piston 197, with its center facing the pressure-reducing flow channel 206 communicated with the reservoir 40. The pressure-reducing valve disc 160 is housed in the control-side liquid chamber 130, being spring-urged toward the pressure-reducing valve seat 207 with its backward limit fixed. The hydraulic pressure of the control-side liquid chamber 130 acts on one face of the elastic member 202 which is liquid-tightly and slidably penetrated by the small-diameter piston portion 197a of the reaction piston 197. The inner part of the other face of the elastic member 202 is placed to face the annular shoulder 197c so as to be deformed and pressed against the annular shoulder 197c of the reaction piston 197 when the hydraulic pressure of the control-side liquid chamber 130 reaches a predetermined value.

Figure 12:
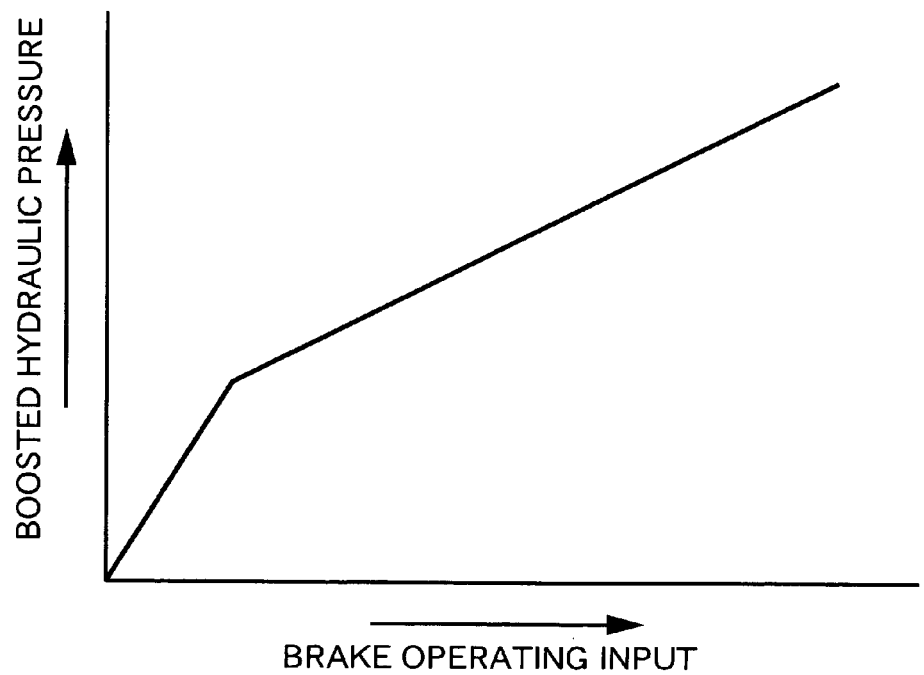
FIG. 12 is a diagram showing characteristics of reaction force.

Structure of the pressure-reducing valve 192 can be simplified by constructing the pressure-reducing valve 192 from the pressure-reducing valve seat 207 installed in the reaction piston 197 connected to the control piston 196 and the pressure-reducing valve disc 160 housed in the control-side liquid chamber 130 facing the front end of the reaction piston 197. The reaction force acting on the reaction piston 197 varies between two stages: a low-load stage in which the hydraulic pressure of the control-side liquid chamber 130 acts on the small pressure surface of the small-diameter piston portion 197a of the reaction piston 197; and a high-load stage in which the hydraulic pressure of the control-side liquid chamber 130 acts not only on the small pressure surface of the small-diameter piston portion 197a, but also on the annular shoulder 197c via the deformed elastic member 202. Thus, ideal braking characteristic can be obtained when the boosted hydraulic pressure generated by the boosted hydraulic pressure chamber 25 is varied in two stages according to the operating input from the brake pedal 11 as shown in FIG. 12.

The baffling member 210 is installed in the control-side liquid chamber 130. The baffling member 210 is located near the booster flow channel 152 of the booster valve 116, to baffle the brake fluid flowing into the control-side liquid chamber 130 through the booster flow channel 152. Thus, when the high-pressure brake fluid from the hydraulic power source 12 flows into the control-side liquid chamber 130 through the booster flow channel 152 upon opening of the booster valve 116, the brake fluid is baffled by the baffling member 210, thereby reducing operating noise and pulsating noise resulting from the operation of the booster valve 116.

The reaction piston 197 is equipped with the insertion hole 204 whose front end is communicated with the control-side liquid chamber 130 and which extends coaxially with the control-side liquid chamber 130, and the through-hole 205 which has the shaft hole 205a coaxial with the insertion hole 204 and which is communicated with the release chamber 135. The flange-shaped pressure-reducing valve seat 207 sticks out radially outward between the insertion hole 204 and the shaft hole 205a. The rear end of the pressure-reducing valve disc 160 which forms the pressure-reducing valve 192 in cooperation with the pressure-reducing valve seat 207 is inserted into the insertion hole 204 so as to form the annular orifice 208 between itself and the reaction piston 197 ahead of the pressure-reducing valve seat 207. Thus, when high pressure in the control-side liquid chamber 130 is released to the release chamber 135 upon opening of the pressure-reducing valve 192, the high pressure passes through a narrow channel between the pressure-reducing valve disc 160 and the pressure-reducing valve seat 207 after being throttled preliminarily by the annular orifice 208 formed between the pressure-reducing valve disc 160 of the pressure-reducing valve 192 and the reaction piston 197. This makes changes in the flow rate of the brake fluid relatively modest, reducing the operating noise of the pressure-reducing valve 192 resulting from an abrupt change in the flow rate.

Furthermore, the reaction piston 197 is equipped with the through-hole 205 which makes the control-side liquid chamber 130 communicated with the release chamber 135, when the pressure-reducing valve 192 is opened. The throttle mechanism 211 is provided between the sleeve 200 and reaction piston 197, with the sleeve 200 being fastened to the backup piston 88 to slidably accept the reaction piston 197. The throttle mechanism 211 passes the brake fluid through the through-hole 205 to the release chamber 135 at full throttle, when the brake pedal 11 and thus the reaction piston 197 are inoperative, but limits passage of the brake fluid through the through-hole 205 to the release chamber 135, when the reaction piston 197 is operated via the brake pedal 11.

Thus, when high pressure in the control-side liquid chamber 130 is released to the release chamber 135 upon opening of the pressure-reducing valve 192, the flow of the brake fluid to the release chamber 135 through the through-hole 205 in the reaction piston 197 is throttled, thereby releasing the high hydraulic pressure slowly to the release chamber 135 to reduce operating noise.

A very simple configuration can be used for the throttle mechanism 211: the sleeve 200 is placed with its rear end facing the release chamber 135; the through-hole 205 is composed of the shaft hole 205a provided in the reaction piston 197 with its front end communicated with the pressure-reducing flow channel 206, and the caves 205b which extend to the shaft hole 205a and open to an outer surface of the reaction piston 197; and the throttle mechanism 211 is composed of the rear end of the sleeve 200 and caves 205b.

Moreover, since the expanded diameter portion 200a which widens toward the open end is formed in the inner circumference of the rear end of the sleeve 200, it is possible to obtain an appropriate amount of throttling by varying the amount of throttling according to the operation of the reaction piston 197.

Figure 13:
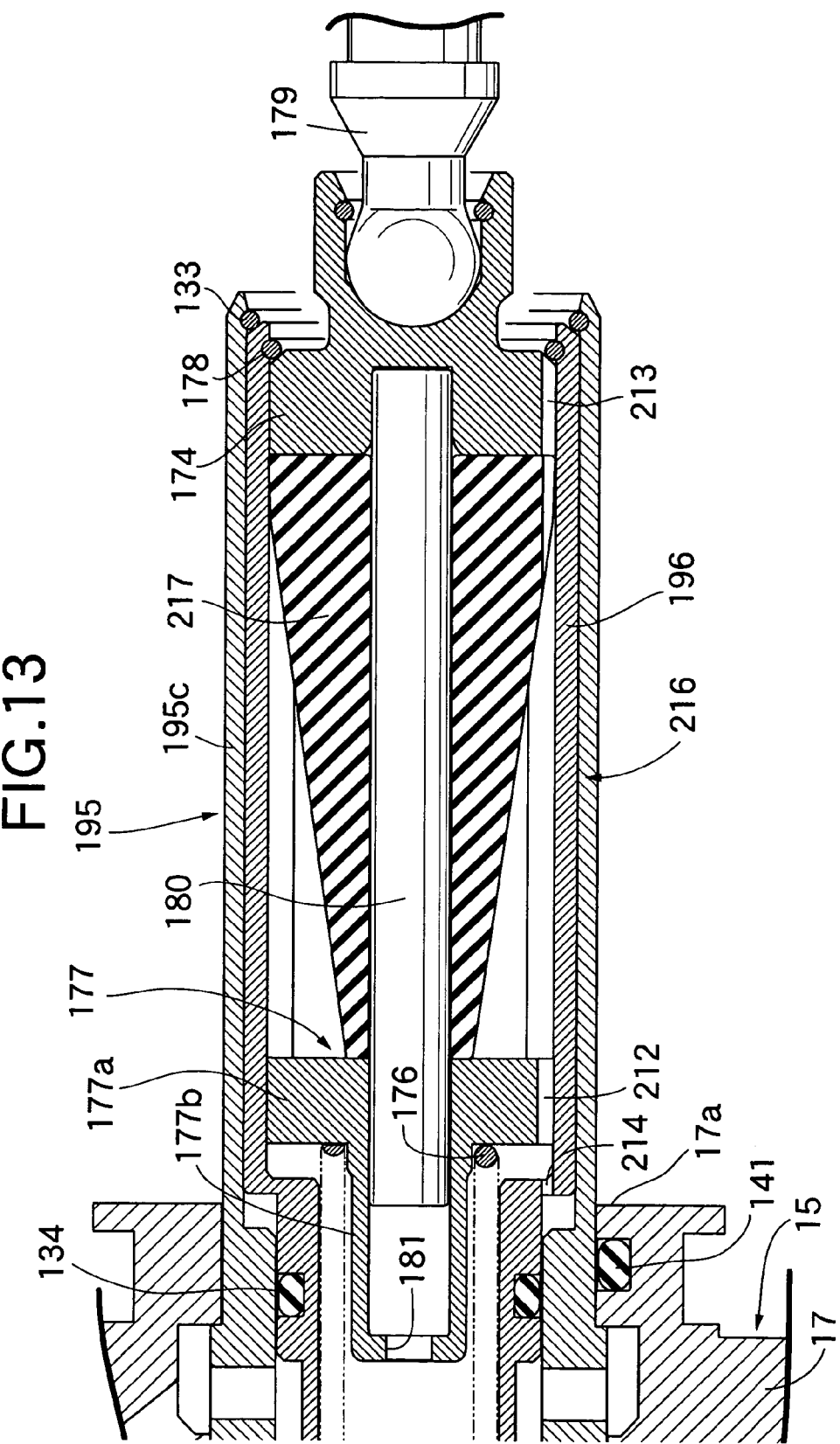
FIG. 13 is an enlarged longitudinal sectional view of a brake stroke simulator, according to a third embodiment of the present invention.

FIG. 13 shows a third embodiment of the present invention, where a brake stroke simulator 216 comprises an input piston 212 housed axially slidably in a control piston 196 as well as an elastic body 217, and the coil spring 176 interposed in series between the input piston 212 and the control piston 196. The brake stroke simulator 216 is housed in the control piston 196, and opens the control piston 196 to the atmosphere.

The elastic body 217 is made of an elastic material such as rubber and has a cylindrical shape. The elastic body 217 and the metallic coil spring 176 smaller in spring load than the elastic body 217, are interposed in series between the input piston 212 and the control piston 196 via an intermediate transmitting member 177.

The elastic body 217 is formed into a cylindrical shape with its outer circumference tapered in the axial direction such that one end is larger in diameter than the other. The elastic body 217 comes into resilient contact with the inner circumference of the control piston 196 by expanding its diameter under an axial compressive force produced by forward movement of the input piston 212.

The third embodiment makes it possible to regulate the amount of change in the area of sliding contact between the elastic body 217 and the control piston 196 according to the operating stroke of a brake pedal 11, thus regulating the hysteresis width.

While the embodiments of the present invention have been described above, the present invention is not limited to the embodiments described above, and various design changes may be made without departing from the subject matter of the present invention set forth in the appended claims.

For example, although a vehicle braking system equipped with a tandem master cylinder M has been described in the above embodiments, the present invention is also applicable to a vehicle braking system equipped with a master cylinder in which a single master piston is slidably housed in a casing.

What is claimed is:

1. A hydraulic controller comprising:
    a pair of liquid chambers; and
    an on-off valve capable of opening and closing a flow channel on the side of the liquid chamber with a higher hydraulic pressure out of the pair of liquid chambers, the flow channel being capable of providing communication between the pair of liquid chambers,
    wherein a baffling means, which opposes the on-off valve, is provided in the liquid chamber with a lower hydraulic pressure out of the pair of liquid chambers, to baffle hydraulic fluid flowing from the higher-pressure liquid chamber into the lower-pressure liquid chamber.

2. The hydraulic controller according to claim 1, wherein the baffling means is a flow rate control valve which varies aperture area of the flow channel opening to the lower-pressure liquid chamber according to pressure difference between the lower-pressure liquid chamber and the flow channel.

3. The hydraulic controller according to claim 2, wherein a valve disc of the flow rate control valve is slidably supported by a support shaft extending linearly and coaxial with the flow channel, and is spring-urged in a direction to close the end of the flow channel which is open to the lower-pressure liquid chamber.

4. The hydraulic controller according to claim 3, wherein a first on-off valve is interposed between an input-side liquid chamber and a control-side liquid chamber, and comprises a valve seat whose middle part faces the end of the flow channel which is open to the input-side liquid chamber, and a first valve disc which is spring-urged in a direction to be seated on the valve seat and is housed in the input-side liquid chamber, wherein a second on-off valve is interposed between a release-side liquid chamber and the control-side liquid chamber to be opened upon opening of the first on-off valve, and comprises a second valve disc which is housed in the control-side liquid chamber so as to be able to reciprocate coaxially with the flow channel of the first on-off valve, and wherein the second valve disc integrally comprises the support shaft which can be inserted into the flow channel to abut against and push the first valve disc in a valve opening direction.

5. The hydraulic controller according to claim 4, further comprising a hydraulic booster composed of:
    a control piston on which brake operating input from a brake operating member acts in a forward direction;
    a reaction means connected coaxially with the control piston so as to apply a reaction force caused by hydraulic pressure of a boosted hydraulic pressure chamber to the control piston in a backward direction, the boosted hydraulic pressure chamber generating boosted hydraulic pressure used to operate wheel brakes;
    the first on-off valve which opens during advance of the control piston and closes during retraction of the control piston, being interposed between the input-side liquid chamber communicated with a hydraulic power source and the control-side liquid chamber connected to the boosted hydraulic pressure chamber; and
    the second on-off valve which closes during advance of the control piston and opens during retraction of the control piston, being interposed between the release-side liquid chamber communicated with a reservoir and the control-side liquid chamber,
    wherein the hydraulic booster regulates hydraulic pressure of the hydraulic power source so as to balance the brake operating input with the reaction force caused by hydraulic pressure of the boosted hydraulic pressure chamber through back and forth movements of the control piston, and applies the hydraulic pressure of the hydraulic power source to the boosted hydraulic pressure chamber, and
    wherein the baffling means is provided in the control-side liquid chamber.

6. A hydraulic controller comprising:
    a pair of liquid chambers; and
    an on-off valve capable of opening and closing a flow channel on the side of the liquid chamber with a higher hydraulic pressure out of the pair of liquid chambers, the flow channel being capable of providing communication between the pair of liquid chambers,
    wherein baffling means is provided in the liquid chamber with a lower hydraulic pressure out of the pair of liquid chambers, to baffle hydraulic fluid flowing from the higher-pressure liquid chamber into the lower-pressure liquid chamber, and
    wherein the baffling means is a flow rate control valve which varies aperture area of the flow channel opening to the lower-pressure liquid chamber according to pressure difference between the lower-pressure liquid chamber and the flow channel.

7. The hydraulic controller according to claim 6, wherein a valve disc of the flow rate control valve is slidably supported by a support shaft extending linearly and coaxial with the flow channel, and is spring-urged in a direction to close the end of the flow channel which is open to the lower-pressure liquid chamber.

8. The hydraulic controller according to claim 7, wherein a first on-off valve is interposed between an input-side liquid chamber and a control-side liquid chamber, and comprises a valve seat whose middle part faces the end of the flow channel which is open to the input-side liquid chamber, and a first valve disc which is spring-urged in a direction to be seated on the valve seat and is housed in the input-side liquid chamber, wherein a second on-off valve is interposed between a release-side liquid chamber and the control-side liquid chamber to be opened upon opening of the first on-off valve, and comprises a second valve disc which is housed in the control-side liquid chamber so as to be able to reciprocate coaxially with the flow channel of the first on-off valve, and wherein the second valve disc integrally comprises the support shaft which can be inserted into the flow channel to abut against and push the first valve disc in a valve opening direction.

9. The hydraulic controller according to claim 8, further comprising a hydraulic booster composed of:
   a control piston on which brake operating input from a brake operating member acts in a forward direction;
   a reaction means connected coaxially with the control piston so as to apply a reaction force caused by hydraulic pressure of a boosted hydraulic pressure chamber to the control piston in a backward direction, the boosted hydraulic pressure chamber generating boosted hydraulic pressure used to operate wheel brakes;
   the first on-off valve which opens during advance of the control piston and closes during retraction of the control piston, being interposed between the input-side liquid chamber communicated with a hydraulic power source and the control-side liquid chamber connected to the boosted hydraulic pressure chamber; and
   the second on-off valve which closes during advance of the control piston and opens during retraction of the control piston, being interposed between the release-side liquid chamber communicated with a reservoir and the control-side liquid chamber,
   wherein the hydraulic booster regulates hydraulic pressure of the hydraulic power source so as to balance the brake operating input with the reaction force caused by hydraulic pressure of the boosted hydraulic pressure chamber through back and forth movements of the control piston, and applies the hydraulic pressure of the hydraulic power source to the boosted hydraulic pressure chamber, and
   wherein the baffling means is provided in the control-side liquid chamber.

* * * * *